United States Patent
Maheshwari et al.

(10) Patent No.: US 11,405,821 B2
(45) Date of Patent: Aug. 2, 2022

(54) PRIORITIZING DATA PACKETS WHEN STATEFUL COMPRESSION IS ENABLED

(71) Applicant: QUALCOMM Incorporated, San Diego, CA (US)

(72) Inventors: Shailesh Maheshwari, San Diego, CA (US); Xing Chen, San Diego, CA (US); Vishal Dalmiya, San Diego, CA (US); Gang Xiao, San Diego, CA (US); Saket Bathwal, Hyderabad (IN); Peng Wu, Shanghai (CN); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 16/641,548

(22) PCT Filed: Sep. 27, 2018

(86) PCT No.: PCT/CN2018/107817
§ 371 (c)(1),
(2) Date: Feb. 24, 2020

(87) PCT Pub. No.: WO2019/062791
PCT Pub. Date: Apr. 4, 2019

(65) Prior Publication Data
US 2020/0359258 A1 Nov. 12, 2020

(51) Int. Cl.
*H04W 72/04* (2009.01)
*H04W 28/06* (2009.01)
(Continued)

(52) U.S. Cl.
CPC ............. *H04W 28/06* (2013.01); *H04L 47/38* (2013.01); *H04L 69/04* (2013.01); *H04W 72/1242* (2013.01)

(58) Field of Classification Search
CPC ... H04W 28/06; H04W 72/1242; H04W 4/00; H04L 47/38; H04L 47/2466; H04L 69/04; H04L 69/16
See application file for complete search history.

(56) References Cited

U.S. PATENT DOCUMENTS

| 7,319,667 B1 * | 1/2008 | Biederman ............. H04L 47/10 370/230.1 |
| 2004/0103277 A1 * | 5/2004 | Seada ................... H04L 63/029 713/160 |

(Continued)

FOREIGN PATENT DOCUMENTS

| CN | 1906906 A | 1/2007 |
| CN | 101491138 A | 7/2009 |
| WO | 2016077730 A1 | 5/2016 |

OTHER PUBLICATIONS

International Search Report and Written Opinion—PCT/CN2017/104032—ISA/EPO—dated Jun. 19, 2018.

(Continued)

*Primary Examiner* — Hassan Kizou
*Assistant Examiner* — Mahbubul Bar Chowdhury
(74) *Attorney, Agent, or Firm* — ArentFox Schiff LLP

(57) ABSTRACT

A method and apparatus for prioritizing data packets when stateful compression is enabled for wireless communications is disclosed. For example, the aspects include receiving a plurality of data packets scheduled in a first order for transmission. The described aspects further include prioritizing one or more data packets of the plurality of data packets as one or more prioritized data packets, each prioritized data packet being scheduled in an order for transmission different from the first order for transmission. The described aspects further include compressing one or more unprioritized data packets of the plurality of data packets into one or more compressed unprioritized data packets. The (Continued)

described aspects further include scheduling the one or more prioritized data packets and the one or more compressed unprioritized data packets in a second order for transmission, the second order differing from the first order.

24 Claims, 14 Drawing Sheets

(51) Int. Cl.
*H04L 47/38* (2022.01)
*H04L 69/04* (2022.01)
*H04W 72/12* (2009.01)

(56) References Cited

U.S. PATENT DOCUMENTS

| | | | |
|---|---|---|---|
| 2004/0136476 A1* | 7/2004 | Rosen | H04L 69/04 375/340 |
| 2004/0199660 A1* | 10/2004 | Liu | H04L 69/04 709/236 |
| 2005/0238051 A1* | 10/2005 | Yi | H04L 69/22 370/469 |
| 2008/0080464 A1* | 4/2008 | Speight | H04L 1/1854 370/342 |
| 2011/0295560 A1* | 12/2011 | Crockford | G16H 20/30 702/187 |
| 2012/0057462 A1 | 3/2012 | Kotecha et al. | |
| 2012/0213150 A1 | 8/2012 | Oguz et al. | |
| 2014/0064259 A1* | 3/2014 | Lee | H04L 45/74 370/338 |
| 2014/0281034 A1* | 9/2014 | Callard | H04L 69/02 709/247 |
| 2014/0313910 A1 | 10/2014 | Appleton et al. | |
| 2014/0369187 A1 | 12/2014 | Sang et al. | |
| 2015/0043363 A1 | 2/2015 | Koskinen et al. | |
| 2016/0142518 A1* | 5/2016 | Raina | H04L 69/04 370/230 |
| 2016/0142932 A1* | 5/2016 | Ahmadzadeh | H04W 28/0278 370/328 |
| 2016/0142934 A1* | 5/2016 | Ahmadzadeh | H04W 72/04 370/328 |
| 2017/0177404 A1* | 6/2017 | Drysdale | G06F 9/546 |
| 2018/0014225 A1* | 1/2018 | Yang | H04W 28/0215 |

OTHER PUBLICATIONS

International Search Report and Written Opinion—PCT/CN2018/107817—ISA/EPO—dated Dec. 28, 2018.
Supplementary European Search Report—EP18860573—Search Authority—HAGUE—dated May 11, 2021.

* cited by examiner

1000

From Block 1012

↓ 1014

Schedule the one or more compressed prioritized data packets for transmission on the second radio bearer

↓ 1016

Schedule the one or more compressed prioritized data packets for transmission on the second radio bearer From Block 1012

↓ 1018

Schedule the one or more compressed prioritized data packets and the one or more compressed unprioritized for transmission on the first radio bearer based on a determination not to establish the second radio bearer for the transmission of the one or more prioritized data packets

FIG. 10C

PRIORITIZING DATA PACKETS WHEN STATEFUL COMPRESSION IS ENABLED

This application is a 35 U.S.C. § 371 National Phase of PCT Application No. PCT/CN2018/107817, filed Sep. 27, 2018, which claims priority to PCT Application No. PCT/CN2017/104032, filed Sep. 28, 2017. The disclosures of the priority applications are hereby incorporated by reference in their entirety.

CLAIM OF PRIORITY

The present Application for Patent claims priority to PCT International Application No. PCT/CN2017/104032 entitled "PRIORITIZING DATA PACKETS WHEN STATEFUL COMPRESSION IS ENABLED" filed Sep. 28, 2017, which is assigned to the assignee hereof and hereby expressly incorporated by reference herein.

BACKGROUND

Aspects of the present disclosure relate generally to wireless communication networks, and more particularly, to prioritizing data packets when stateful compression is enabled in a wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

In some instances, for a wireless communications technology, compressed data packets are required to be transmitted in the order that they were compressed or else a compressor of the transmitting device and a decompressor of the receiving device may become out-of-synchronization. However, one or more of the data packets may need to be prioritized and delivered out of the order compared to the order that the data packets were compressed. Thus, improvements in wireless communication operations, such as, prioritizing data packets when stateful compression is enabled, may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method includes prioritizing data packets when stateful compression is enabled for wireless communications. The described aspects include receiving a plurality of data packets scheduled in a first order for transmission. The described aspects further include prioritizing one or more data packets of the plurality of data packets as one or more prioritized data packets, each prioritized data packet being scheduled in an order for transmission different from the first order for transmission. The described aspects further include compressing one or more unprioritized data packets of the plurality of data packets into one or more compressed unprioritized data packets. The described aspects further include scheduling the one or more prioritized data packets and the one or more compressed unprioritized data packets in a second order for transmission, the second order differing from the first order.

In an aspect, an apparatus for prioritizing data packets when stateful compression is enabled for wireless communications may include a transceiver, a memory; and at least one processor coupled to the memory and configured to receive a plurality of data packets scheduled in a first order for transmission. The described aspects further prioritize one or more data packets of the plurality of data packets as one or more prioritized data packets, each prioritized data packet being scheduled in an order for transmission different from the first order for transmission. The described aspects further compress one or more unprioritized data packets of the plurality of data packets into one or more compressed unprioritized data packets. The described aspects further schedule the one or more prioritized data packets and the one or more compressed unprioritized data packets in a second order for transmission, the second order differing from the first order.

In an aspect, a computer-readable medium may store computer executable code for prioritizing data packets when stateful compression is enabled for wireless communications is described. The described aspects include code for receiving a plurality of data packets scheduled in a first order for transmission. The described aspects further include code for prioritizing one or more data packets of the plurality of data packets as one or more prioritized data packets, each prioritized data packet being scheduled in an order for transmission different from the first order for transmission. The described aspects further include code for compressing one or more unprioritized data packets of the plurality of data packets into one or more compressed unprioritized data packets. The described aspects further include code for scheduling the one or more prioritized data packets and the one or more compressed unprioritized data packets in a second order for transmission, the second order differing from the first order.

In an aspect, an apparatus for prioritizing data packets when stateful compression is enabled for wireless communications is described. The described aspects include means for receiving a plurality of data packets scheduled in a first order for transmission. The described aspects further include means for prioritizing one or more data packets of the plurality of data packets as one or more prioritized data packets, each prioritized data packet being scheduled in an order for transmission different from the first order for transmission. The described aspects further include means for compressing one or more unprioritized data packets of the plurality of data packets into one or more compressed unprioritized data packets. The described aspects further include means for scheduling the one or more prioritized data packets and the one or more compressed unprioritized data packets in a second order for transmission, the second order differing from the first order.

In accordance with another aspect, a method includes prioritizing data packets when stateful compression is enabled for wireless communications. The described aspects include receiving a plurality of data packets scheduled in a first order for transmission. The described aspects further include prioritizing one or more data packets of the plurality of data packets as one or more prioritized data packets, each prioritized data packet being scheduled in an order for transmission different from the first order for transmission. The described aspects further include aggregating the one or more prioritized data packets into a first group of prioritized data packets and aggregating one or more unprioritized data packets into a second group of unprioritized data packets. The described aspects further include compressing the first group of prioritized data packets into a first group of compressed prioritized data packets and compressing the second group of unprioritized data packets into a second group of compressed unprioritized data packets. The described aspects further include scheduling the first group of compressed prioritized data packets and the second group of compressed unprioritized data packets in a second order for transmission, the second order differing from the first order.

In an aspect, an apparatus for prioritizing data packets when stateful compression is enabled for wireless communications may include a transceiver, a memory; and at least one processor coupled to the memory and configured to receive a plurality of data packets scheduled in a first order for transmission. The described aspects further prioritize one or more data packets of the plurality of data packets as one or more prioritized data packets, each prioritized data packet being scheduled in an order for transmission different from the first order for transmission. The described aspects further aggregate the one or more prioritized data packets into a first group of prioritized data packets and aggregate one or more unprioritized data packets into a second group of unprioritized data packets. The described aspects further compress the first group of prioritized data packets into a first group of compressed prioritized data packets and compress the second group of unprioritized data packets into a second group of compressed unprioritized data packets. The described aspects further schedule the first group of compressed prioritized data packets and the second group of compressed unprioritized data packets in a second order for transmission, the second order differing from the first order.

In an aspect, a computer-readable medium may store computer executable code for prioritizing data packets when stateful compression is enabled for wireless communications is described. The described aspects include code for receiving a plurality of data packets scheduled in a first order for transmission. The described aspects further include code for prioritizing one or more data packets of the plurality of data packets as one or more prioritized data packets, each prioritized data packet being scheduled in an order for transmission different from the first order for transmission. The described aspects further include code for aggregating the one or more prioritized data packets into a first group of prioritized data packets and aggregating the one or more unprioritized data packets into a second group of unprioritized data packets. The described aspects further include code for compressing the first group of prioritized data packets into a first group of compressed prioritized data packets and compressing the second group of unprioritized data packets into a second group of compressed unprioritized data packets. The described aspects further include code for scheduling the first group of compressed prioritized data packets and the second group of compressed unprioritized data packets in a second order for transmission, the second order differing from the first order.

In an aspect, an apparatus for prioritizing data packets when stateful compression is enabled for wireless communications is described. The described aspects include means for receiving a plurality of data packets scheduled in a first order for transmission. The described aspects further include means for prioritizing one or more data packets of the plurality of data packets as one or more prioritized data packets, each prioritized data packet being scheduled in an order for transmission different from the first order for transmission. The described aspects further include means for aggregating the one or more prioritized data packets into a first group of prioritized data packets and aggregating the one or more unprioritized data packets into a second group of unprioritized data packets. The described aspects further include means for compressing the first group of prioritized data packets into a first group of compressed prioritized data packets and compressing the second group of unprioritized data packets into a second group of compressed unprioritized data packets. The described aspects further include means for scheduling the first group of compressed prioritized data packets and the second group of compressed unprioritized data packets in a second order for transmission, the second order differing from the first order.

In accordance with another aspect, a method includes prioritizing data packets when stateful compression is enabled for wireless communications. The described aspects include receiving a plurality of data packets scheduled in a first order for transmission. The described aspects further include prioritizing one or more data packets of the plurality of data packets as one or more prioritized data packets, each prioritized data packet being scheduled in an order for transmission different from the first order for transmission. The described aspects further include compressing the one or more prioritized data packets into one or more compressed prioritized data packets based on a first compression context. The described aspects further include compressing one or more unprioritized data packets into one or more compressed unprioritized data packets based on a second compression context. The described aspects further include scheduling the one or more compressed prioritized data packets and the one or more compressed unprioritized data packets in a second order for transmission, the second order differing from the first order.

In an aspect, an apparatus for prioritizing data packets when stateful compression is enabled for wireless communications may include a transceiver, a memory; and at least one processor coupled to the memory and configured to receive a plurality of data packets scheduled in a first order for transmission. The described aspects further prioritize one or more data packets of the plurality of data packets as one or more prioritized data packets, each prioritized data packet being scheduled in an order for transmission different from the first order for transmission. The described aspects further compress the one or more prioritized data packets into one or more compressed prioritized data packets based on a first compression context. The described aspects further compress one or more unprioritized data packets into one or more compressed unprioritized data packets based on a second compression context. The described aspects further schedule the one or more compressed prioritized data packets and the one or more compressed unprioritized data packets in a second order for transmission, the second order differing from the first order.

In an aspect, a computer-readable medium may store computer executable code for prioritizing data packets when stateful compression is enabled for wireless communications is described. The described aspects include code for receiving a plurality of data packets scheduled in a first order for transmission. The described aspects further include code for prioritizing one or more data packets of the plurality of data packets as one or more prioritized data packets, each prioritized data packet being scheduled in an order for transmission different from the first order for transmission. The described aspects further include code for compressing the one or more prioritized data packets into one or more compressed prioritized data packets based on a first compression context. The described aspects further include code for compressing one or more unprioritized data packets into one or more compressed unprioritized data packets based on a second compression context. The described aspects further include code for scheduling the one or more compressed prioritized data packets and the one or more compressed unprioritized data packets in a second order for transmission, the second order differing from the first order.

In an aspect, an apparatus for prioritizing data packets when stateful compression is enabled for wireless communications is described. The described aspects include means for receiving a plurality of data packets scheduled in a first order for transmission. The described aspects further include means for prioritizing one or more data packets of the plurality of data packets as one or more prioritized data packets, each prioritized data packet being scheduled in an order for transmission different from the first order for transmission. The described aspects further include means for compressing the one or more prioritized data packets into one or more compressed prioritized data packets based on a first compression context. The described aspects further include means for compressing one or more unprioritized data packets into one or more compressed unprioritized data packets based on a second compression context. The described aspects further include means for scheduling the one or more compressed prioritized data packets and the one or more compressed unprioritized data packets in a second order for transmission, the second order differing from the first order.

In accordance with another aspect, a method includes prioritizing data packets when stateful compression is enabled for wireless communications. The described aspects include receiving a plurality of data packets scheduled in a first order for transmission on a first radio bearer. The described aspects further include prioritizing one or more data packets of the plurality of data packets as one or more prioritized data packets, each prioritized data packet being scheduled in an order for transmission different from the first order for transmission. The described aspects further include determining whether to establish a second radio bearer for the transmission of the one or more prioritized data packets. The described aspects further include establishing the second radio bearer for the transmission of the one or more prioritized data packets based on a determination to establish the second radio bearer for the transmission of the one or more prioritized data packets. The described aspects further include compressing the one or more prioritized data packets into one or more compressed prioritized data packets based on a first compression context. The described aspects further include compressing one or more unprioritized data packets into one or more compressed unprioritized data packets based on a second compression context. The described aspects further include scheduling the one or more compressed prioritized data packets for transmission on the second radio bearer. The described aspects further include scheduling the one or more compressed unprioritized data packets for transmission on the first radio bearer.

In an aspect, an apparatus for prioritizing data packets when stateful compression is enabled for wireless communications may include a transceiver, a memory; and at least one processor coupled to the memory and configured to receive a plurality of data packets scheduled in a first order for transmission on a first radio bearer. The described aspects further prioritize one or more data packets of the plurality of data packets as one or more prioritized data packets, each prioritized data packet being scheduled in an order for transmission different from the first order for transmission. The described aspects further determine whether to establish a second radio bearer for the transmission of the one or more prioritized data packets. The described aspects further establish the second radio bearer for the transmission of the one or more prioritized data packets based on a determination to establish the second radio bearer for the transmission of the one or more prioritized data packets. The described aspects further compress the one or more prioritized data packets into one or more compressed prioritized data packets based on a first compression context. The described aspects further compress one or more unprioritized data packets into one or more compressed unprioritized data packets based on a second compression context. The described aspects further schedule the one or more compressed prioritized data packets for transmission on the second radio bearer. The described aspects further schedule the one or more compressed unprioritized data packets for transmission on the first radio bearer.

In an aspect, a computer-readable medium may store computer executable code for prioritizing data packets when stateful compression is enabled for wireless communications is described. The described aspects include code for receiving a plurality of data packets scheduled in a first order for transmission on a first radio bearer. The described aspects further include code for prioritizing one or more data packets of the plurality of data packets as one or more prioritized data packets, each prioritized data packet being scheduled in an order for transmission different from the first order for transmission. The described aspects further include code for establishing the second radio bearer for the transmission of the one or more prioritized data packets based on a determination to establish the second radio bearer for the transmission of the one or more prioritized data packets. The described aspects further include code for compressing the one or more prioritized data packets into one or more compressed prioritized data packets based on a first compression context. The described aspects further include code for compressing one or more unprioritized data packets into one or more compressed unprioritized data packets based on a second compression context. The described aspects further include code for scheduling the one or more compressed prioritized data packets for transmission on the second radio bearer. The described aspects further include code for scheduling the one or more compressed unprioritized data packets for transmission on the first radio bearer.

In an aspect, an apparatus for prioritizing data packets when stateful compression is enabled for wireless communications is described. The described aspects include means for receiving a plurality of data packets scheduled in a first order for transmission on a first radio bearer. The described aspects further include means for prioritizing one or more data packets of the plurality of data packets as one or more prioritized data packets, each prioritized data packet being scheduled in an order for transmission different from the first order for transmission. The described aspects further include means for establishing the second radio bearer for the transmission of the one or more prioritized data packets based on a determination to establish the second radio bearer for the transmission of the one or more prioritized data packets. The described aspects further include means for compressing the one or more prioritized data packets into one or more compressed prioritized data packets based on a first compression context. The described aspects further include means for compressing one or more unprioritized data packets into one or more compressed unprioritized data packets based on a second compression context. The described aspects further include means for scheduling the one or more compressed prioritized data packets for transmission on the second radio bearer. The described aspects further include means for scheduling the one or more compressed unprioritized data packets for transmission on the first radio bearer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 10A-10C are flow diagrams of a fourth example of a method prioritizing data packets when stateful compression is enabled for wireless communications;

DETAILED DESCRIPTION

Figure 1:
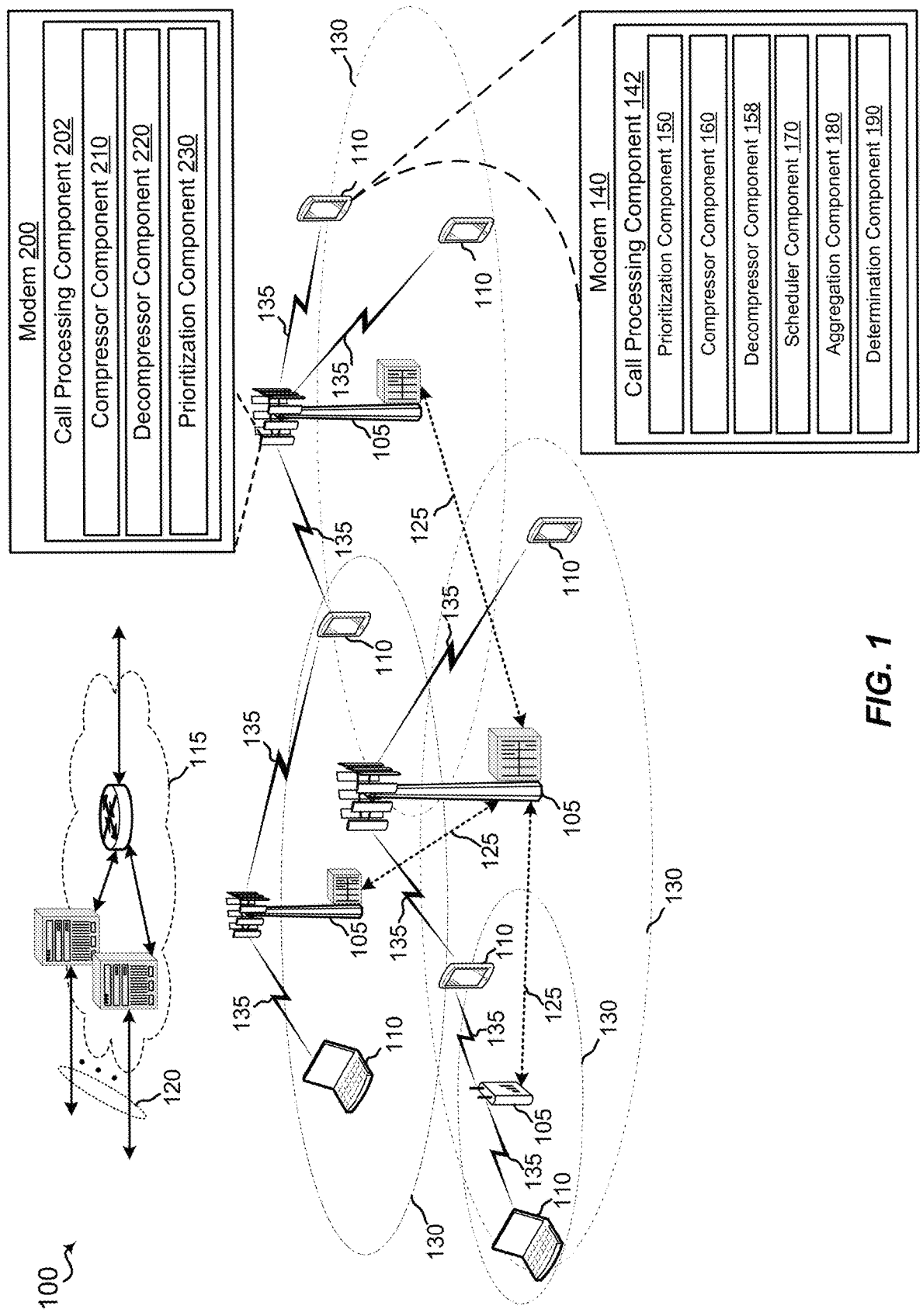
FIG. 1 is a schematic diagram of an example of a wireless communication network including at least one base station having a call processing component and at least one user equipment (UE) having a call processing component configured to prioritize data packets when stateful compression is enabled.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to prioritizing data packets when stateful compression is enabled for wireless communications. For example, a receiver device, such as a base station, and a transmitter device, such as a UE, may establish wireless communications. In some instances, both the receiver device and the transmitter device may enable stateful compression using a Robust Header Compression (ROHC) procedure or an Uplink Data Compression (UDC) procedure in order to minimize the size of the data packets. However, due to limitations in the previous compression procedures, the plurality of data packets that are compressed need to be transmitted in the order that they were compressed so that the receiver device's decompressor remains in synchronization with the transmitter device's compressor. This is due to the limitations of the current compression process in which the compressor memory of the compressor at the transmitter device and the compressor memory of the decompressor at the receiver device may become out-of-synchronization if compressed data packets are transmitted out of the order in which they were compressed.

In an aspect, certain packets that are scheduled for transmission may need to be prioritized so as to enhance both downlink and uplink performance. For example, the transmitter device may desire to prioritize data packets corresponding to Transmission Control Protocol (TCP) Acknowledgements (ACKs) over other data packets in the same radio bearer and/or flow. By prioritizing certain packets, such as TCP ACKs, throughput performance may increase since the receiver device may transmit data packets at a faster rate in response to receiving the TCP ACKs sooner. As such, a need exists to prioritize certain data packets that are to be compressed and scheduled for transmission in an order different from the order in which they were compressed.

Accordingly, in some aspects, the present methods and apparatuses may provide an efficient solution, as compared to conventional solutions, by prioritizing data packets when stateful compression is enabled for wireless communications. As such, the present methods and apparatus may include receiving a plurality of data packets scheduled in a first order for transmission. The described aspects further include prioritizing one or more data packets of the plurality of data packets as one or more prioritized data packets, each prioritized data packet being scheduled in an order for transmission different from the first order for transmission. The described aspects further include compressing one or more unprioritized data packets of the plurality of data packets into one or more compressed unprioritized data packets. The described aspects further include scheduling the one or more prioritized data packets and the one or more compressed unprioritized data packets in a second order for transmission, the second order differing from the first order.

In another aspect, the present methods and apparatuses may include receiving a plurality of data packets scheduled in a first order for transmission. The described aspects further include prioritizing one or more data packets of the plurality of data packets as one or more prioritized data packets, each prioritized data packet being scheduled in an order for transmission different from the first order for transmission. The described aspects further include aggregating the one or more prioritized data packets into a first group of prioritized data packets and one or more unprioritized data packets into a second group of unprioritized data packets. The described aspects further include compressing the first group of prioritized data packets into a first group of compressed prioritized data packets and the second group of unprioritized data packets into a second group of compressed unprioritized data packets. The described aspects further include scheduling the first group of compressed prioritized data packets and the second group of compressed unprioritized data packets in a second order for transmission, the second order differing from the first order.

In another aspect, the present methods and apparatuses may include receiving a plurality of data packets scheduled in a first order for transmission. The described aspects further include prioritizing one or more data packets of the plurality of data packets as one or more prioritized data packets, each prioritized data packet being scheduled in an order for transmission different from the first order for transmission. The described aspects further include compressing the one or more prioritized data packets into one or more compressed prioritized data packets based on a first compression context. The described aspects further include compressing one or more unprioritized data packets into one or more compressed unprioritized data packets based on a second compression context. The described aspects further include scheduling the one or more compressed prioritized data packets and the one or more compressed unprioritized data packets in a second order for transmission, the second order differing from the first order.

In another aspect, the present methods and apparatuses may include receiving a plurality of data packets scheduled in a first order for transmission on a first radio bearer. The described aspects further include prioritizing one or more data packets of the plurality of data packets as one or more prioritized data packets, each prioritized data packet being scheduled in an order for transmission different from the first order for transmission. The described aspects further include determining whether to establish a second radio bearer for the transmission of the one or more prioritized data packets. The described aspects further include establishing the second radio bearer for the transmission of the one or more prioritized data packets based on a determination to establish the second radio bearer for the transmission of the one or more prioritized data packets. The described aspects further include compressing the one or more prioritized data packets into one or more compressed prioritized data packets based on a first compression context. The described aspects further include compressing one or more unprioritized data packets into one or more compressed unprioritized data packets based on a second compression context. The described aspects further include scheduling the one or more compressed prioritized data packets for transmission on the second radio bearer. The described aspects further include scheduling the one or more compressed unprioritized data packets for transmission on the first radio bearer.

Additional features of the present aspects are described in more detail below with respect to FIGS. 1-12.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 2:
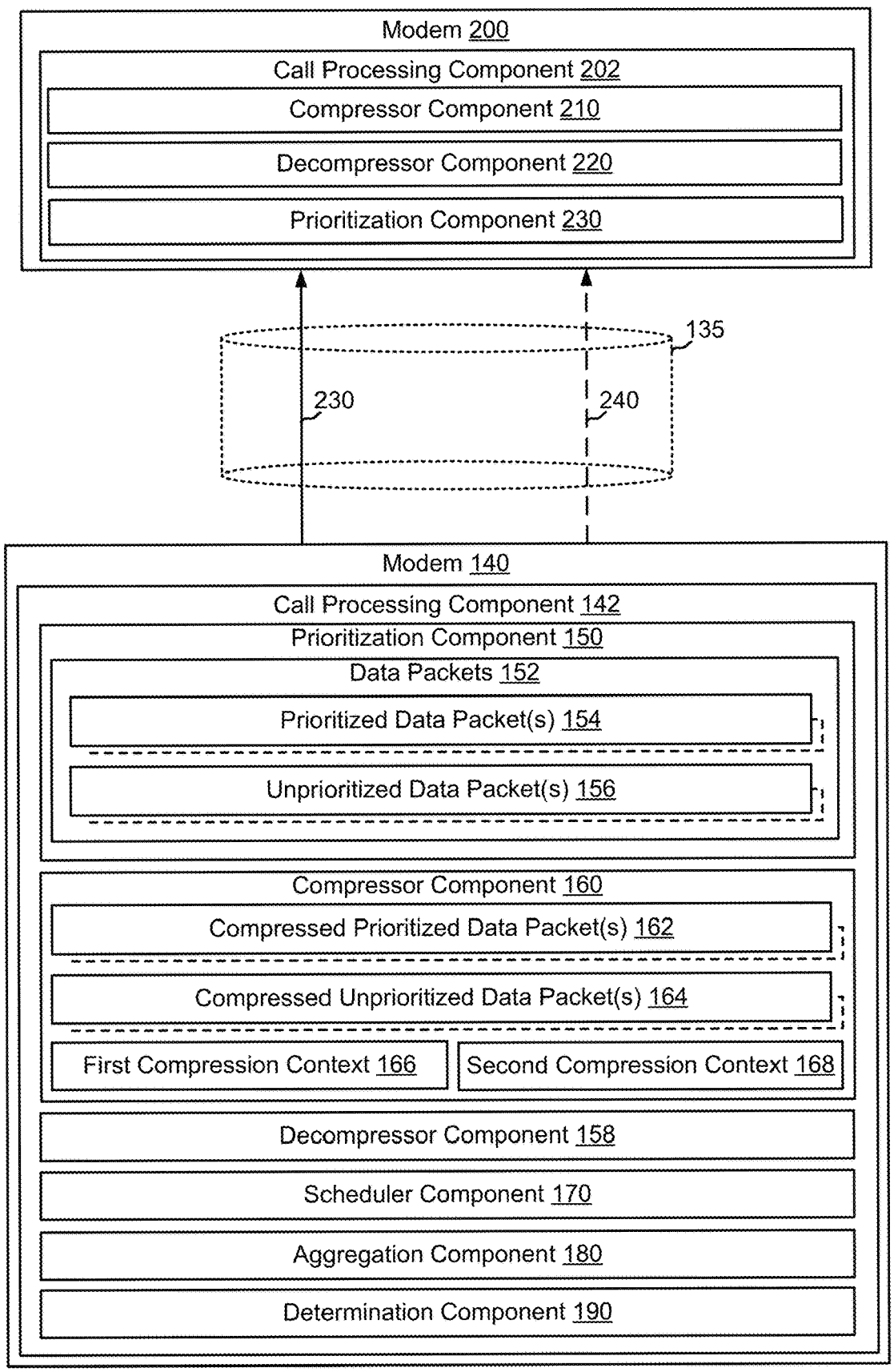
FIG. 2 is a schematic diagram of an exemplary aspect of call processing in a wireless communication system.

Referring to FIGS. 1 and 2, in accordance with various aspects of the present disclosure, an example wireless communication network 100 includes at least one UE 110 with a modem 140 having a call processing component 142 that performs data packet prioritization when stateful compression is enabled. Further, wireless communication network 100 includes at least one base station 105 with a modem 200 having a call processing component 202 that performs data packet prioritization when stateful compression is enabled.

For example, the UE 110 and base station 105 may enable stateful compression, such that, the data packets sent on wireless communication links 135 are compressed data packets. In this example, the call processing component 142 of the UE 110 may include a compressor component 160 configured to compressed one or more data packets. The call processing component 202 of the base station 105 may include a decompressor component 220 which receives the compressed data packets and decompresses them accordingly. Similarly, the call processing component 202 of the base station 105 may include a compressor component 210 that compresses one or more data packets and transmits them to the decompressor component 158 of UE 110, which decompresses the compressed data packets. However, in order to prioritize one or more data packets over other data packets when stateful compression is enabled between the UE 110 and base station 105, the UE 110 may employ a number of processes to prioritize certain data packets that are to be compressed and scheduled for transmission in an order different from the order in which they were compressed. Thus, according to the present disclosure, the UE 110 may prioritize one or more data packets when stateful compression is enabled so as to schedule the prioritized data packets out of order for transmission to base station 105. Referring to FIG. 2, the call processing component 142 and call processing component 202 may each include a plurality of sub-components for performing data packet prioritization when stateful compression is enabled, as described herein.

In an aspect, the call processing component 142 may be configured to receive a plurality of data packets 152 scheduled in a first order for transmission. For example, the call processing component 142 may execute a prioritization component 150 to prioritize one or more data packets of the plurality of data packets 152 as one or more prioritized data packets 154, such that each prioritized data packet 154 is scheduled in an order for transmission different from the first order for transmission. The call processing component 142 may execute the compressor component 160 to compress one or more unprioritized data packets 156 of the plurality of data packets 152 into one or more compressed unprioritized data packets 164. The call processing component 142 may execute a scheduler component 170 to schedule the one or more prioritized data packets 154 and the one or more compressed unprioritized data packets 164 in a second order for transmission with the second order differing from the first order.

In another aspect, the call processing component 142 may be configured to receive a plurality of data packets 152 scheduled in a first order for transmission. For example, the call processing component 142 may execute the prioritization component 150 to prioritize one or more data packets of the plurality of data packets 152 as one or more prioritized data packets 154, such that each prioritized data packet 154 is scheduled in an order for transmission different from the first order for transmission. The call processing component 142 may execute a aggregation component 180 to aggregate the one or more prioritized data packets 154 into a first group of prioritized data packets 154 and aggregate one or more unprioritized data packets 156 into a second group of unprioritized data packets 156. The call processing component 142 may execute the compressor component 160 to compress the first group of prioritized data packets 154 into a first group of compressed prioritized data packets 162 and to compress the second group of unprioritized data packets 156 into a second group of compressed unprioritized data packets 164. The call processing component 142 may execute the scheduler component 170 to schedule the first group of compressed prioritized data packets 162 and the second group of compressed unprioritized data packets 164 in a second order for transmission with the second order differing from the first order.

In another aspect, the call processing component 142 may be configured to receive a plurality of data packets 152 scheduled in a first order for transmission. For example, the call processing component 142 may execute the prioritization component 150 to prioritize one or more data packets of the plurality of data packets 152 as one or more prioritized data packets 154, such that each prioritized data packet 154 is scheduled in an order for transmission different from the first order for transmission. The call processing component 142 may execute the compressor component 160 to compress the one or more prioritized data packets 154 into one or more compressed prioritized data packets 162 based on a first compression context 166. The call processing component 142 may execute the compressor component 160 to compress one or more unprioritized data packets 156 into one or more compressed unprioritized data packets 164 based on a second compression context 168. For example, the first compression context 166 may correspond to a first compressor memory configured to store data strings for the compressed prioritized data packets 162, and the second compression context 168 corresponds to a second compressor memory configured to store data strings for the one or more compressed unprioritized data packets 164. The call processing component 142 may execute the scheduler component 170 to schedule scheduling the one or more compressed prioritized data packets 162 and the one or more compressed unprioritized data packets 164 in a second order for transmission with the second order differing from the first order.

In another aspect, the call processing component 142 may be configured to receive a plurality of data packets 152 scheduled in a first order for transmission on a first radio bearer 230. In an instance, the first radio bearer 230 corresponds to a communication channel for transmitting data packets. For example, the call processing component 142 may execute the prioritization component 150 to prioritize one or more data packets of the plurality of data packets 152 as one or more prioritized data packets 154, such that each prioritized data packet 154 is scheduled in an order for transmission different from the first order for transmission. The call processing component 142 may execute a determination component 190 to determine whether to establish a second radio bearer 240 for the transmission of the one or more prioritized data packets 154, and to establish the second radio bearer 240 for the transmission of the one or more prioritized data packets 154 based on a determination to establish the second radio bearer 240 for the transmission of the one or more prioritized data packets 154. In an instance, the second radio bearer 240 corresponds to a communication channel for transmitting data packets. The call processing component 142 may execute the compressor component 160 to compress the one or more prioritized data packets 154 into one or more compressed prioritized data packets 162 based on a first compression context 166. The call processing component 142 may execute the compressor component 160 to compress one or more unprioritized data packets 156 into one or more compressed unprioritized data packets 164 based on a second compression context 168. The call processing component 142 may execute the scheduler component 170 to schedule the one or more compressed prioritized data packets 162 for transmission on the second radio bearer 240. The call processing component 142 may execute the scheduler component 170 to schedule the one or more compressed unprioritized data packets 164 for transmission on the first radio bearer 230.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, the base stations 105 or UEs 110 may include multiple antennas for employing antenna diversity schemes to improve communication quality and reliability between the base stations 105 and UEs 110. Additionally or alternatively, the base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of the base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Although the operations of the call processing component 142 are described herein with regard to a UE, such as UE 110, the components of the call processing component 202 of the base station 105 may be the same as or similar to the corresponding components of the call processing component 142 of the UE 110, as described above, but configured or otherwise programmed for base station operations as opposed to UE operations.

Figure 3:
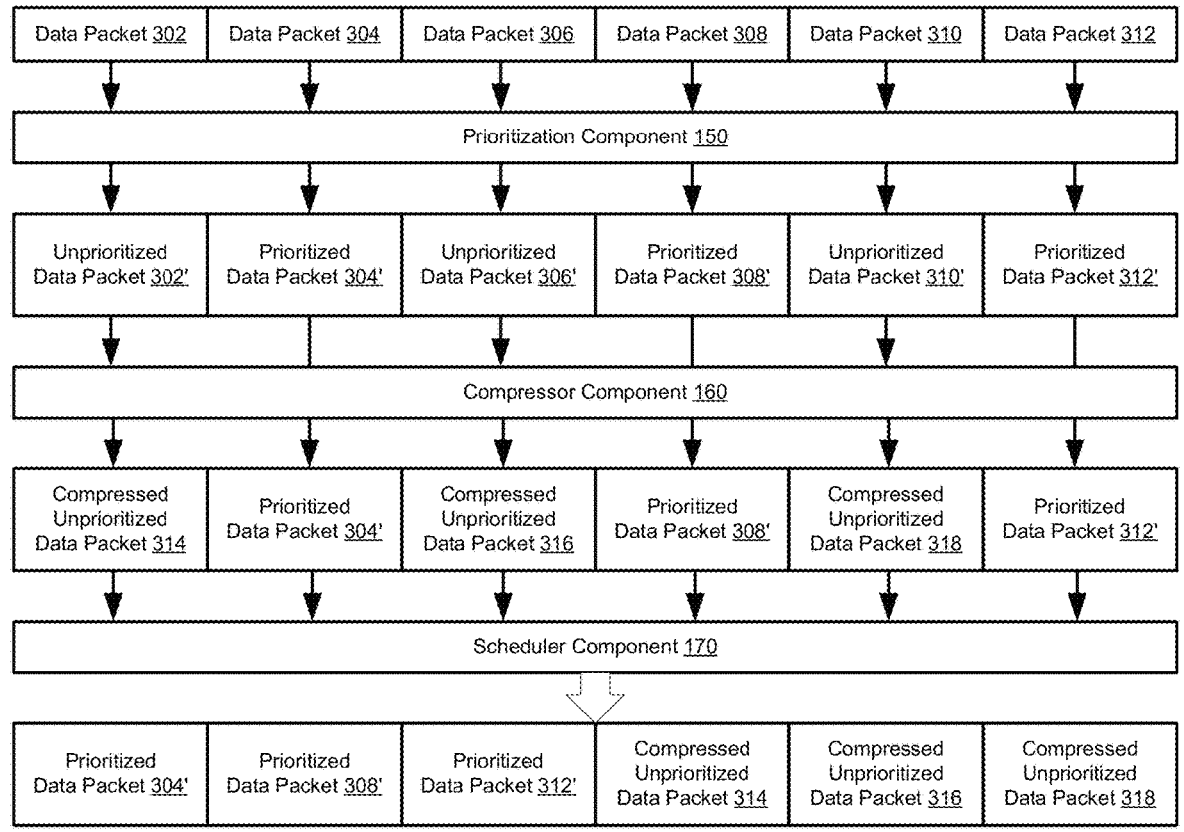
FIG. 3 is a conceptual diagram of a first example of prioritizing data packets when stateful compression is enabled.

FIG. 3 depicts a conceptual diagram of an example of a scheme 300 for prioritizing data packets when stateful compression is enabled at a UE communicating with a base station. For example, the UE and the base station may correspond to the UE 110 and the base station 105, respectively, located in wireless communication network 100 as shown in FIG. 1. The UE 110 may include a modem 140 having a call processing component 142 that performs prioritization of data packets when stateful compression is enabled by scheduling prioritized data packet(s) 154 for transmission as uncompressed data packets.

In an aspect, a plurality of data packets 302, 304, 306, 308, 310, and 312 scheduled in a first order for transmission may be received by the call processing component 142. For example, the call processing component 142 may execute prioritization component 150 to prioritize the plurality of data packets 302, 304, 306, 308, 310, and 312. As a result of prioritization, data packets 302', 306', and 310' remain unprioritized, while data packets 304', 308', and 312' are prioritized. Each prioritized data packet 304', 308', and 312' is designated to be scheduled in an order for transmission different from the first order for transmission.

In an aspect, the call processing component 142 may execute the compressor component 160 to compress the unprioritized data packets 302', 306' and 310' into compressed unprioritized data packets 314, 316, and 318. The prioritized data packets 304', 308', and 312' skip the compression process, so that they are not bound to the first order of transmission. Further, the call processing component 142 may execute the scheduler component 170 to schedule the prioritized data packets 304', 308', and 312', and the compressed unprioritized data packets 314, 316, and 318, in a second order for transmission. For example, the second order for transmission differs from that of the first order in that the prioritized data packets 304', 308', and 312' are scheduled for transmission before the compressed unprioritized data packets 314, 316, and 318. As a result, the UE 110 may reconfigure the order of transmission of data packets in order to improve downlink performance while still improving uplink compression gain.

Figure 4:
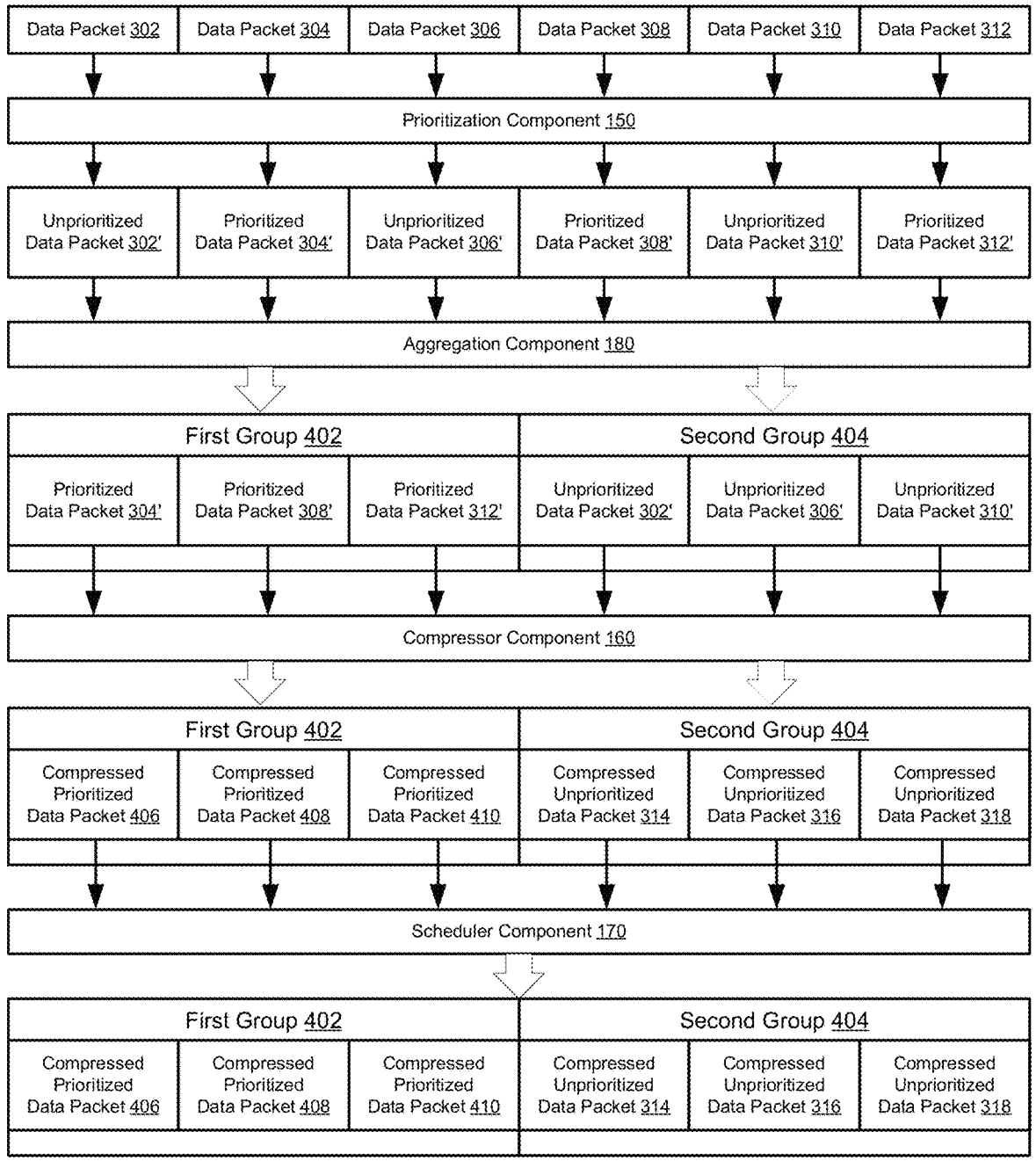
FIG. 4 is a conceptual diagram of a second example of prioritizing data packets when stateful compression is enabled.

FIG. 4 depicts a conceptual diagram of an example of a scheme 400 for prioritizing data packets when stateful compression is enabled at a UE communicating with a base station. For example, the UE and the base station may correspond to the UE 110 and the base station 105, respectively, located in wireless communication network 100 as shown in FIG. 1. The UE 110 may include a modem 140 having a call processing component 142 that performs prioritization of data packets when stateful compression is enabled by aggregating the data packets of the plurality of data packets 152 before compression.

In an aspect, a plurality of data packets 302, 304, 306, 308, 310, and 312 scheduled in a first order for transmission may be received by the call processing component 142. For example, the call processing component 142 may execute prioritization component 150 to prioritize the plurality of data packets 302, 304, 306, 308, 310, and 312. As a result of prioritization, data packets 302', 306', and 310' remain unprioritized, while data packets 304', 308', and 312' are prioritized. Each prioritized data packet 304', 308' and 312' is scheduled in an order for transmission different from the first order for transmission.

In an aspect, the call processing component 142 may execute the aggregation component 180 to aggregate the prioritized data packets 304', 308' and 312' into a first group 402 of prioritized data packets and aggregate unprioritized data packets 302', 306' and 310' into a second group 404 of unprioritized data packets. Further, the call processing component 142 may execute the compressor component 160 to compress the first group 402 of prioritized data packets 304', 308', and 312' into a first group 402 of compressed prioritized data packets 406, 408, and 410, and compress the second group 404 of unprioritized data packets 302', 306', and 310' into a second group 404 of compressed unprioritized data packets 314, 316, and 318.

In an aspect, the call processing component 142 may execute the scheduler component 170 to schedule the first group 402 of compressed prioritized data packets 406, 408, and 410, and schedule the second group 404 of compressed unprioritized data packets 314, 316, and 318 in a second order for transmission. For example, the first group 402 of compressed prioritized data packets 406, 408, and 410 have priority over the second group 404 of compressed unprioritized data packets 314, 316, and 318. As such, the order of transmission changes from the original first order of the data packets in the plurality of data packets 302, 304, 306, 308, 310, and 312. By transmitting the first group 402 before the second group 404, the UE 110 improves downlink performance while still improving uplink compression gain.

Figure 5:
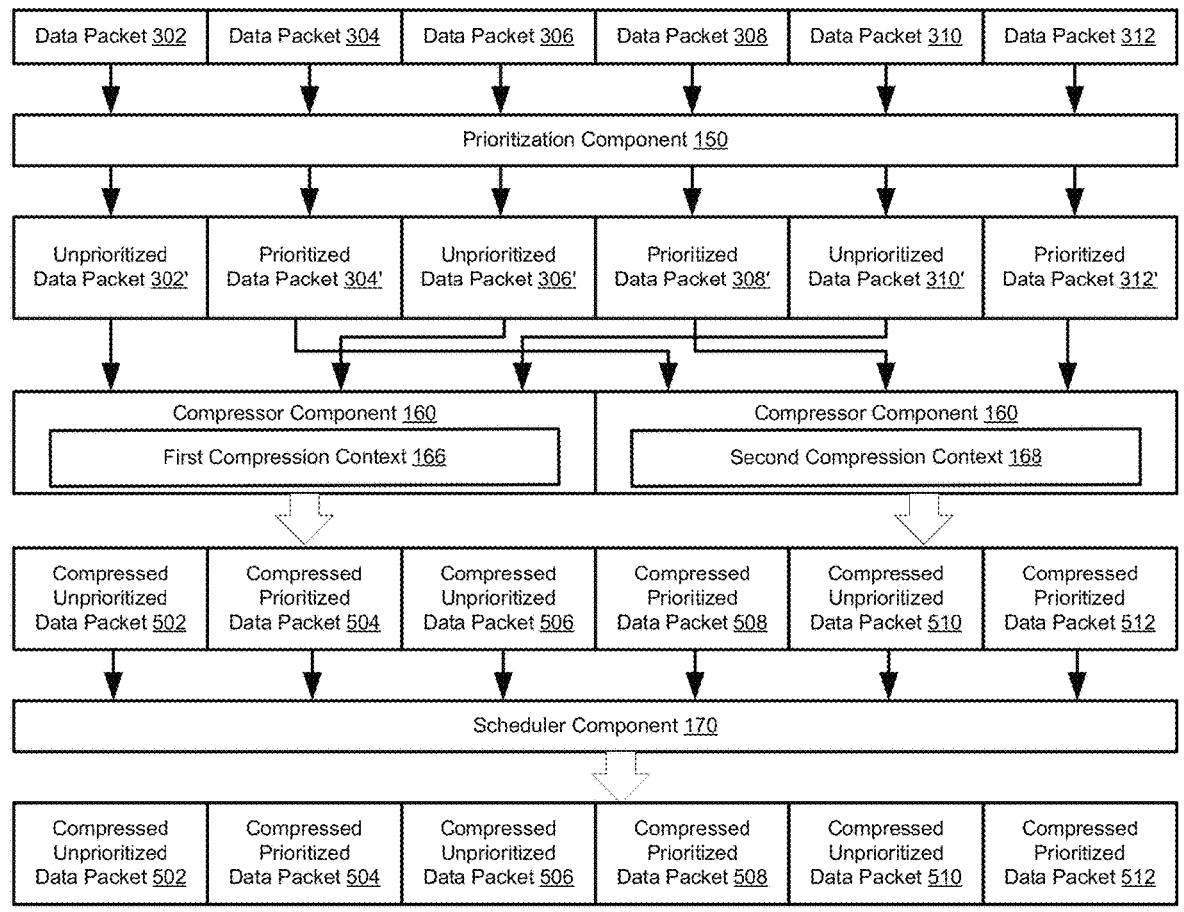
FIG. 5 is a conceptual diagram of a third example of prioritizing data packets when stateful compression is enabled.

FIG. 5 depicts a conceptual diagram of an example of a scheme 500 for prioritizing data packets when stateful compression is enabled at a UE communicating with a base station. For example, the UE and the base station may correspond to the UE 110 and the base station 105, respectively, located in wireless communication network 100 as shown in FIG. 1. The UE 110 may include a modem 140 having a call processing component 142 that performs prioritization of data packets when stateful compression is enabled by compressing the plurality of data packets using different compression contexts.

In an aspect, a plurality of data packets 302, 304, 306, 308, 310, and 312 scheduled in a first order for transmission may be received by the call processing component 142. For example, the call processing component 142 may execute prioritization component 150 to prioritize the plurality of data packets 302, 304, 306, 308, 310, and 312. As a result of prioritization, data packets 302', 306', and 310' remain unprioritized, while data packets 304', 308', and 312' are prioritized. Each prioritized data packet 304', 308' and 312' is designated to be scheduled in an order for transmission different from the first order for transmission.

In an aspect, the call processing component 142 may execute the compressor component 160 to compress the prioritized data packets 304', 308', and 312' into one or more compressed prioritized data packets 504, 508, and 512 based on a first compression context 166. Further, the call processing component 142 may execute the compressor component 160 to compress the unprioritized data packets 302', 306', and 310' into one or more compressed unprioritized data packets 502, 506, and 510 based on a second compression context 168. For example, the first compression context 166 may correspond to compressing the prioritized data packets 304', 308', and 312' using a first compressor memory configured to store data strings for the prioritized data packets 304', 308', and 312', and the second compression context 168 corresponds to compressing the unprioritized data packets 302', 306', and 310' a second compressor memory configured to store data strings for the one or more unprioritized data packets 302', 306', and 310'. As such, each compressed prioritized data packet 504, 508, and 512, and each compressed unprioritized data packet 502, 506, and 510 includes a header with compression context information indicating either the use of the first compressor memory or the second compressor memory, so that a decompressor, such as decompressor component 220, knows which compressor memory to use to decompress the received compressed data packet.

In an aspect, the call processing component 142 may execute the scheduler component 170 to schedule the compressed prioritized data packets 504, 508, and 512, and the compressed unprioritized data packets 502, 506, and 510, in a second order for transmission. For example, the order of transmission is independent between data packets compressed based on the first compression context 166 and the second compression context 168. As such, the scheduler component 170 may schedule the compressed prioritized data packets 504, 508, and 512 independently of the compressed unprioritized data packets 502, 506, and 510 since compressed prioritized data packets 504, 508, and 512 will be decompressed using a first compressor memory, and compressed unprioritized data packets 502, 506, and 510 will be decompressed using a second compressor memory.

Figure 6:
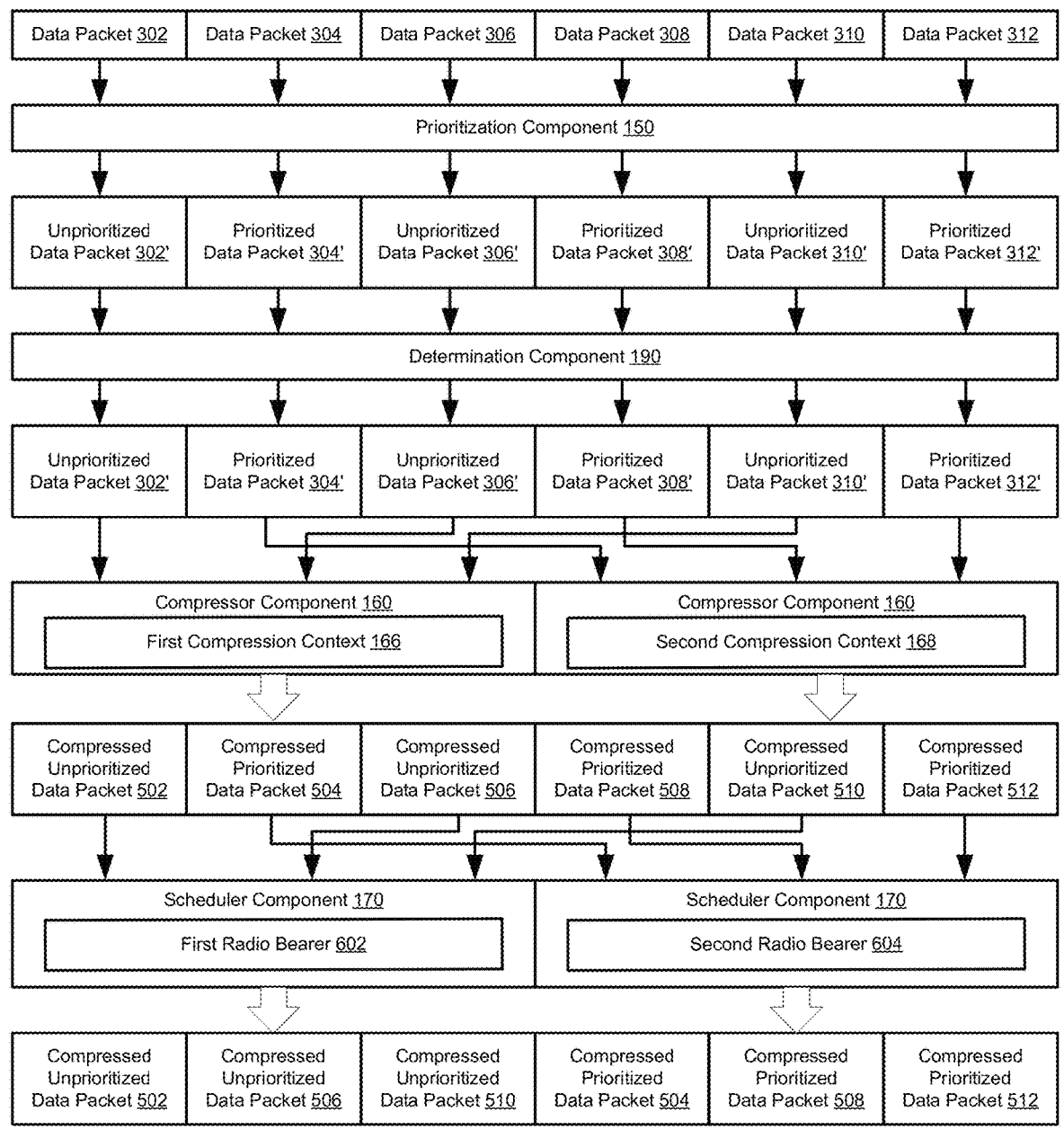
FIG. 6 is a conceptual diagram of a fourth example of prioritizing data packets when stateful compression is enabled.

FIG. 6 depicts a conceptual diagram of an example of a scheme 600 for prioritizing data packets when stateful compression is enabled at a UE communicating with a base station. For example, the UE and the base station may correspond to the UE 110 and the base station 105, respectively, located in wireless communication network 100 as shown in FIG. 1. The UE 110 may include a modem 140 having a call processing component 142 that performs prioritization of data packets when stateful compression is enabled by establishing a second radio bearer, that is different from a first radio bearer, for prioritized data packets.

In an aspect, a plurality of data packets 302, 304, 306, 308, 310, and 312 scheduled in a first order for transmission may be received by the call processing component 142. For example, the call processing component 142 may execute prioritization component 150 to prioritize the plurality of data packets 302, 304, 306, 308, 310, and 312. As a result of prioritization, data packets 302', 306', and 310' remain unprioritized, while data packets 304', 308', and 312' are prioritized. Each prioritized data packet 304', 308' and 312' is designated to be scheduled in an order for transmission different from the first order for transmission.

In an aspect, the call processing component 142 may execute determination component 190 to determine whether to establish a second radio bearer 604 for the transmission of the prioritized data packets 304', 308' and 312', and to establish the second radio bearer 604 for the transmission of the prioritized data packets 304', 308' and 312'.

In an aspect, the call processing component 142 may execute the compressor component 160 to compressing the prioritized data packets 304', 308', and 312' into one or more compressed prioritized data packets 504, 508, and 512 based on a first compression context 166. Further, the call processing component 142 may execute the compressor component 160 to compress the unprioritized data packets 302', 306', and 310' into one or more compressed unprioritized data packets 502, 506, and 510 based on a second compression context 168. For example, the first compression context 166 may correspond to compressing the prioritized data packets 304', 308', and 312' using a first compressor memory configured to store data strings for the prioritized data packets 304', 308', and 312', and the second compression context 168 corresponds to compressing the unprioritized data packets 302', 306', and 310' a second compressor memory configured to store data strings for the one or more unprioritized data packets 302', 306', and 310'. As such, each compressed prioritized data packet 504, 508, and 512, and each compressed unprioritized data packet 502, 506, and 510 includes a header with compression context information indicating either the use of the first compressor memory or the second compressor memory, so that a decompressor, such as decompressor component 220, knows which compressor memory to use to decompress the received compressed data packet.

In an aspect, the call processing component 142 may execute the scheduler component 170 to schedule the compressed prioritized data packets 504, 508, and 512 for transmission on the second radio bearer 604. Moreover, the call processing component 142 may execute the scheduler component 170 to schedule the compressed unprioritized data packet 502, 506, and 510 for transmission on the first radio bearer 602. As a result, the information in the prioritized data packets 304', 308', and 312' may be transmitted as compressed prioritized data packet 504, 508, and 512 on the second bearer 604 independently of the compressed unprioritized data packet 502, 506, and 510 transmitted on the first radio bearer 602.

Figure 7:
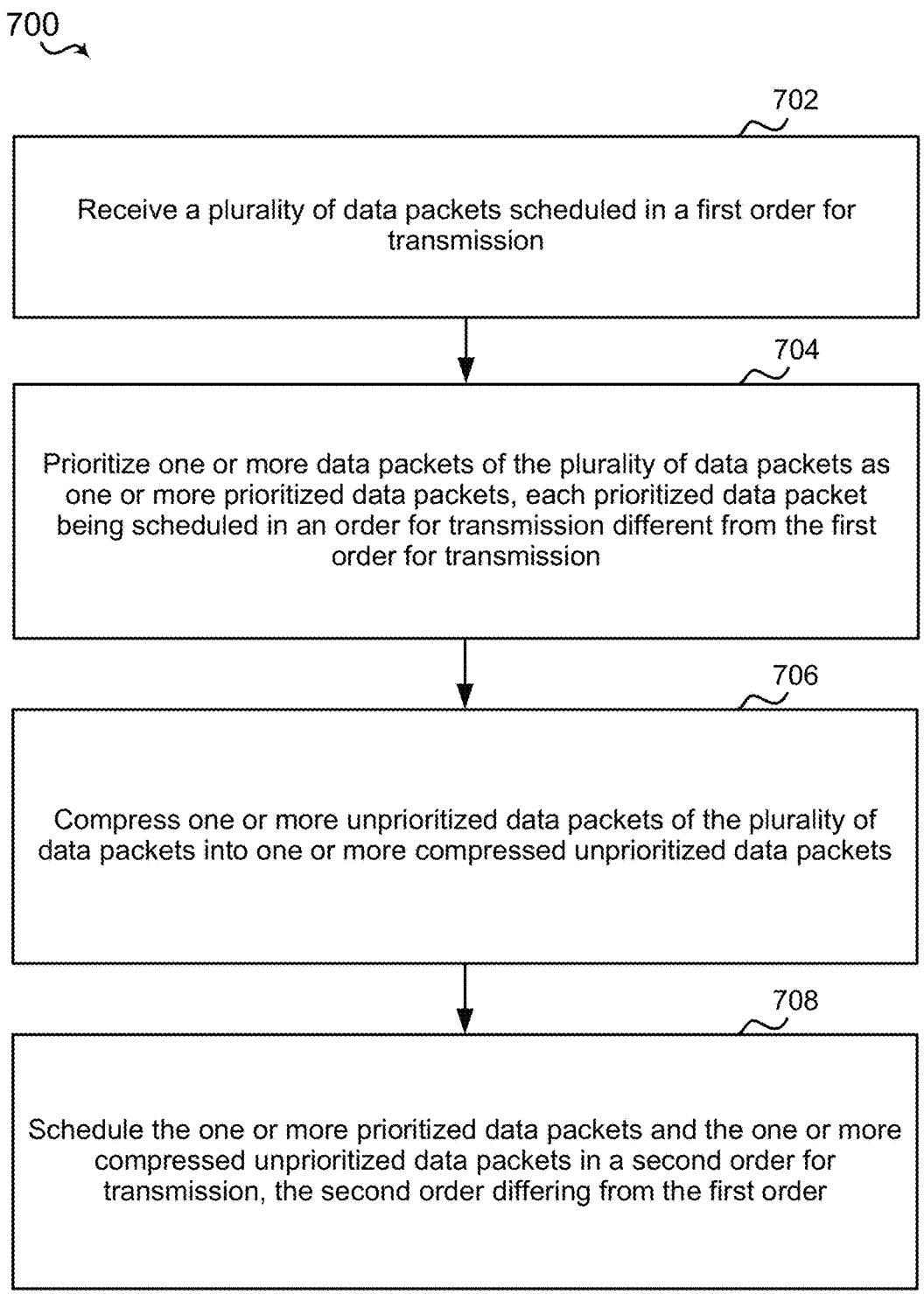
FIG. 7 is a flow diagram of a first example of a method prioritizing data packets when stateful compression is enabled for wireless communications.

Referring to FIG. 7, for example, a method 700 of wireless communication in operating UE 110 according to the above-described aspects to prioritizing data packets when stateful compression is enabled includes one or more of the herein-defined actions.

At block 702, the method 700 may receive a plurality of data packets scheduled in a first order for transmission. For example, the UE 110 may execute call processing component 142 to receive a plurality of data packets 152 scheduled in a first order for transmission.

At block 704, the method 700 may prioritize one or more data packets of the plurality of data packets as one or more prioritized data packets, each prioritized data packet being scheduled in an order for transmission different from the first order for transmission. For example, the UE 110 and/or call processing component 142 may execute the prioritization component 150 to prioritize one or more data packets of the plurality of data packets 152 as one or more prioritized data packets 154 with each prioritized data packet 154 being scheduled in an order for transmission different from the first order for transmission.

In an aspect, prioritizing the one or more data packets of the plurality of data packets 152 further comprises prioritizing the one or more data packets of the plurality of data packets 152 scheduled for transmission based on a traffic model of a data flow corresponding to the plurality of data packets 152. For example, the traffic model corresponds to a bi-directional communication and indicates that data packets corresponding to acknowledgment messages are to be prioritized. In this example, the acknowledgement messages correspond to Transmission Control Protocol (TCP) Acknowledgements (ACKs). Moreover, the unprioritized data packet corresponds to Uplink (UL) Transmission Control Protocol (TCP) DATA.

In an aspect, prioritizing the one or more data packets of the plurality of data packets 152 further comprises prioritizing the one or more data packets of the plurality of data packets 152 in at least one of a Transmission Control Protocol (TCP) layer or Internet Protocol (IP) layer.

At block 706, the method 700 may compress one or more unprioritized data packets of the plurality of data packets into one or more compressed unprioritized data packets. For example, the UE 110 and/or call processing component 142 may execute the compressor component 160 to compress one or more unprioritized data packets 156 of the plurality of data packets 152 into one or more compressed unprioritized data packets 164.

In an aspect, compressing the one or more unprioritized data packets 156 of the plurality of data packets 152 into the one or more compressed unprioritized data packets 164 further comprises compressing the one or more unprioritized data packets 156 of the plurality of data packets 152 into the one or more compressed unprioritized data packets 164 based on at least one of a Robust Header Compression (ROHC) procedure or an Uplink Data Compression (UDC) procedure.

At block 708, the method 700 may schedule the one or more prioritized data packets and the one or more compressed unprioritized data packets in a second order for transmission, the second order differing from the first order. For example, the UE 110 and/or call processing component 142 may execute the scheduler component 170 to schedule the one or more prioritized data packets 154 and the one or more compressed unprioritized data packets 164 in a second order for transmission with the second order differing from the first order. In an example, the second order for transmission corresponds to scheduling the one or more prioritized data packets 154 for transmission prior to the one or more compressed unprioritized data packets 164.

Figure 8:
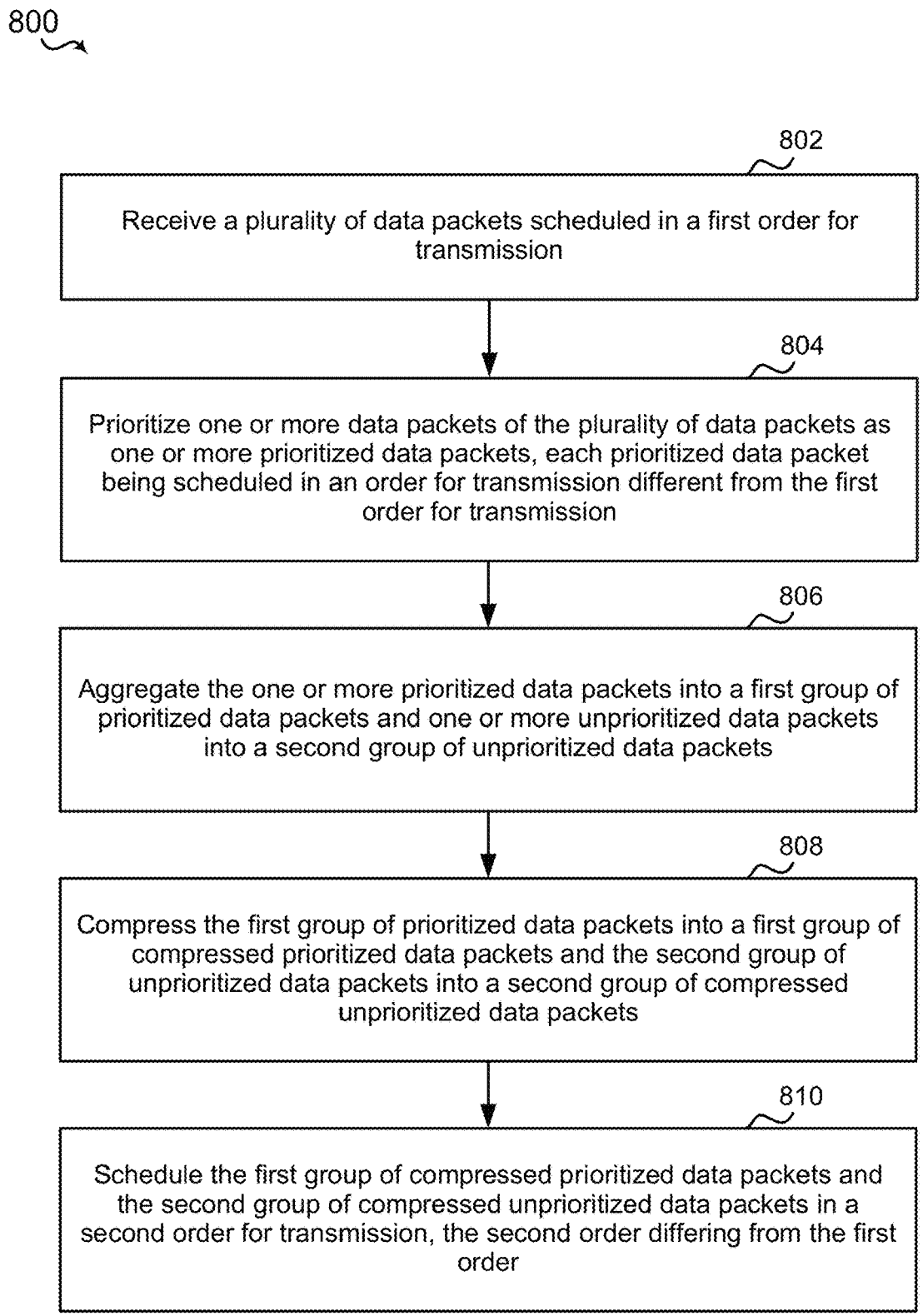
FIG. 8 is a flow diagram of a second example of a method prioritizing data packets when stateful compression is enabled for wireless communications.

Referring to FIG. 8, for example, a method 800 of wireless communication in operating UE 110 according to the above-described aspects to prioritizing data packets when stateful compression is enabled includes one or more of the herein-defined actions.

At block 802, the method 800 may receive a plurality of data packets scheduled in a first order for transmission. For example, the UE 110 may execute call processing component 142 to receive a plurality of data packets 152 scheduled in a first order for transmission.

At block 804, the method 800 may prioritize one or more data packets of the plurality of data packets as one or more prioritized data packets, each prioritized data packet being scheduled in an order for transmission different from the first order for transmission. For example, the UE 110 and/or call processing component 142 may execute the prioritization component 150 to prioritize one or more data packets of the plurality of data packets 152 as one or more prioritized data packets 154 with each prioritized data packet 154 being scheduled in an order for transmission different from the first order for transmission.

In an aspect, prioritizing the one or more data packets of the plurality of data packets 152 further comprises prioritizing the one or more data packets of the plurality of data packets 152 in at least one of a TCP layer or IP layer. In an example, the one or more prioritized data packets 154 correspond to TCP ACKs. Further, the one or more unprioritized data packets 156 correspond to UL TCP DATA.

At block 806, the method 800 may aggregate the one or more prioritized data packets into a first group of prioritized data packets and aggregate one or more unprioritized data packets into a second group of unprioritized data packets. For example, the UE 110 and/or call processing component 142 may execute the aggregation component 180 to aggregate the one or more prioritized data packets 154 into a first group 402 of prioritized data packets 154 and aggregate the one or more unprioritized data packets 156 into a second group 404 of unprioritized data packets 156.

At block 808, the method 800 may compress the first group of prioritized data packets into a first group of compressed prioritized data packets and the second group of unprioritized data packets into a second group of compressed unprioritized data packets. For example, the UE 110 and/or call processing component 142 may execute the compressor component 160 to compress the first group 402 of prioritized data packets 154 into a first group 402 of compressed prioritized data packets 162 and compress the second group 404 of unprioritized data packets 156 into a second group 404 of compressed unprioritized data packets 164.

In an aspect, compressing the first group 402 of prioritized data packets 154 into a first group 402 of compressed prioritized data packets 162 and compressing the second group 404 of unprioritized data packets 156 into a second group 404 of compressed unprioritized data packets 164 further comprises compressing the first group 402 of prioritized data packets 154 into a first group 402 of compressed prioritized data packets 162 and compressing the second group 404 of unprioritized data packets 156 into a second group 404 of compressed unprioritized data packets 164 based on at least one of a ROHC procedure or an UDC procedure.

At block 810, the method 800 may schedule the first group of compressed prioritized data packets and the second group of compressed unprioritized data packets in a second order for transmission, the second order differing from the first order. For example, the UE 110 and/or call processing component 142 may execute the scheduler component 170 to schedule the first group 402 of compressed prioritized data packets 162 and the second group 404 of compressed unprioritized data packets 164 in a second order for transmission with the second order differing from the first order. In an example, the second order for transmission corresponds to scheduling the first group 402 of compressed prioritized data packets 162 for transmission prior to the second group 404 of compressed unprioritized data packets 164.

Figure 9:
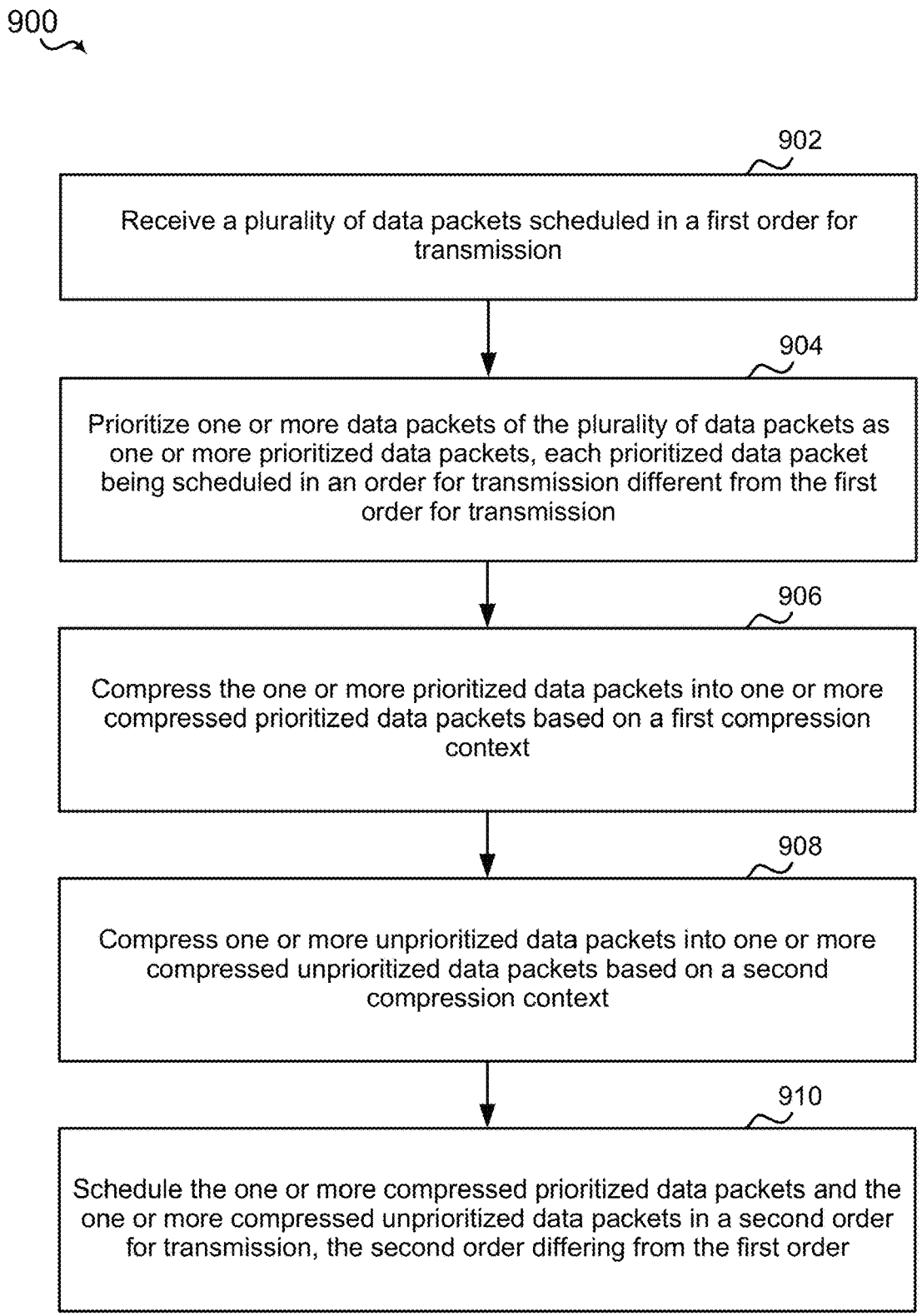
FIG. 9 is a flow diagram of a third example of a method prioritizing data packets when stateful compression is enabled for wireless communications.

Referring to FIG. 9, for example, a method 900 of wireless communication in operating UE 110 according to the above-described aspects to prioritizing data packets when stateful compression is enabled includes one or more of the herein-defined actions.

At block 902, the method 900 may receive a plurality of data packets scheduled in a first order for transmission. For example, the UE 110 may execute call processing component 142 to receive a plurality of data packets 152 scheduled in a first order for transmission.

At block 904, the method 900 may prioritize one or more data packets of the plurality of data packets as one or more prioritized data packets, each prioritized data packet being scheduled in an order for transmission different from the first order for transmission. For example, the UE 110 and/or call processing component 142 may execute the prioritization component 150 to prioritize one or more data packets of the plurality of data packets 152 as one or more prioritized data packets 154 with each prioritized data packet 154 being scheduled in an order for transmission different from the first order for transmission. In an aspect, prioritizing the one or more data packets of the plurality of data packets 152 further comprises prioritizing the one or more data packets of the plurality of data packets 152 in at least one of a TCP layer or IP layer. In an example, the one or more prioritized data packets 154 correspond to TCP ACKs. Further, the one or more unprioritized data packets 156 correspond to UL TCP DATA.

At block 906, the method 900 may compress the one or more prioritized data packets into one or more compressed prioritized data packets based on a first compression context. For example, the UE 110 and/or call processing component 142 may execute the compressor component 160 to compress the one or more prioritized data packets 154 into one or more compressed prioritized data packets 162 based on a first compression context 166.

At block 908, the method 900 may compress one or more unprioritized data packets into one or more compressed unprioritized data packets based on a second compression context. For example, the UE 110 and/or call processing component 142 may execute the compressor component 160 to compress one or more unprioritized data packets 156 into one or more compressed unprioritized data packets 164 based on a second compression context 168.

In an aspect, compressing the one or more prioritized data packets 154 into one or more compressed prioritized data packets 162 based on a first compression context 166 and compressing the one or more unprioritized data packets 156 into one or more compressed unprioritized data packets 164 based on a second compression context 168 further comprises compressing the one or more prioritized data packets 154 into one or more compressed prioritized data packets 162 and compressing the one or more unprioritized data packets 156 into one or more compressed unprioritized data packets 164 based on an UDC procedure. In an example, the first compression context 166 corresponds to a first compressor memory configured to store data strings for the one or more prioritized data packets 154 and the second compression context 168 corresponds to a second compressor memory configured to store data strings for the one or more unprioritized data packets 156. Further, each compressed prioritized data packet 162 and each compressed unprioritized data packet 164 includes a header with compression context information indicating either the first compressor memory or the second compressor memory. Additionally, the UDC procedure includes utilizing at least one of a UDC data packet, a UDC control packet, and a Radio Resource Control (RRC) signaling message configured to support multiple compressor memories.

In another aspect, compressing the one or more prioritized data packets 154 into one or more compressed prioritized data packets 162 based on a first compression context 166 and compressing the one or more unprioritized data packets 156 into one or more compressed unprioritized data packets 164 based on a second compression context 168 further comprises compressing the one or more prioritized data packets 154 into one or more compressed prioritized data packets 162 and compressing the one or more unprioritized data packets 156 into one or more compressed unprioritized data packets 164 based on a ROHC procedure. In an example, each compressed prioritized data packet 162 and each compressed unprioritized data packet 164 includes a header with flow context identification indicating a priority of each compressed prioritized data packet 162 or each compressed unprioritized data packet 164.

At block 910, the method 900 may schedule the one or more compressed prioritized data packets and the one or more compressed unprioritized data packets in a second order for transmission, the second order differing from the first order. For example, the UE 110 and/or call processing component 142 may execute the scheduler component 170 to schedule the one or more compressed prioritized data packets 162 and the one or more compressed unprioritized data packets 164 in a second order for transmission with the second order differing from the first order.

In an aspect, method 900 may further include determining whether a prioritization parameter disabling prioritization satisfies a threshold, and disabling prioritization of the one or more data packets based on a determination that the prioritization parameter satisfies the threshold. For example, the prioritization parameter corresponds to an amount of time that prioritization has occurred, and the threshold corresponds to a maximum period of time configured for prioritization. In another example, the prioritization parameter corresponds to a number of remaining uncompressed data packets of the plurality of data packets 152, and the threshold corresponds to a minimum number of remaining data packets configured for prioritization.

Figure 10A:
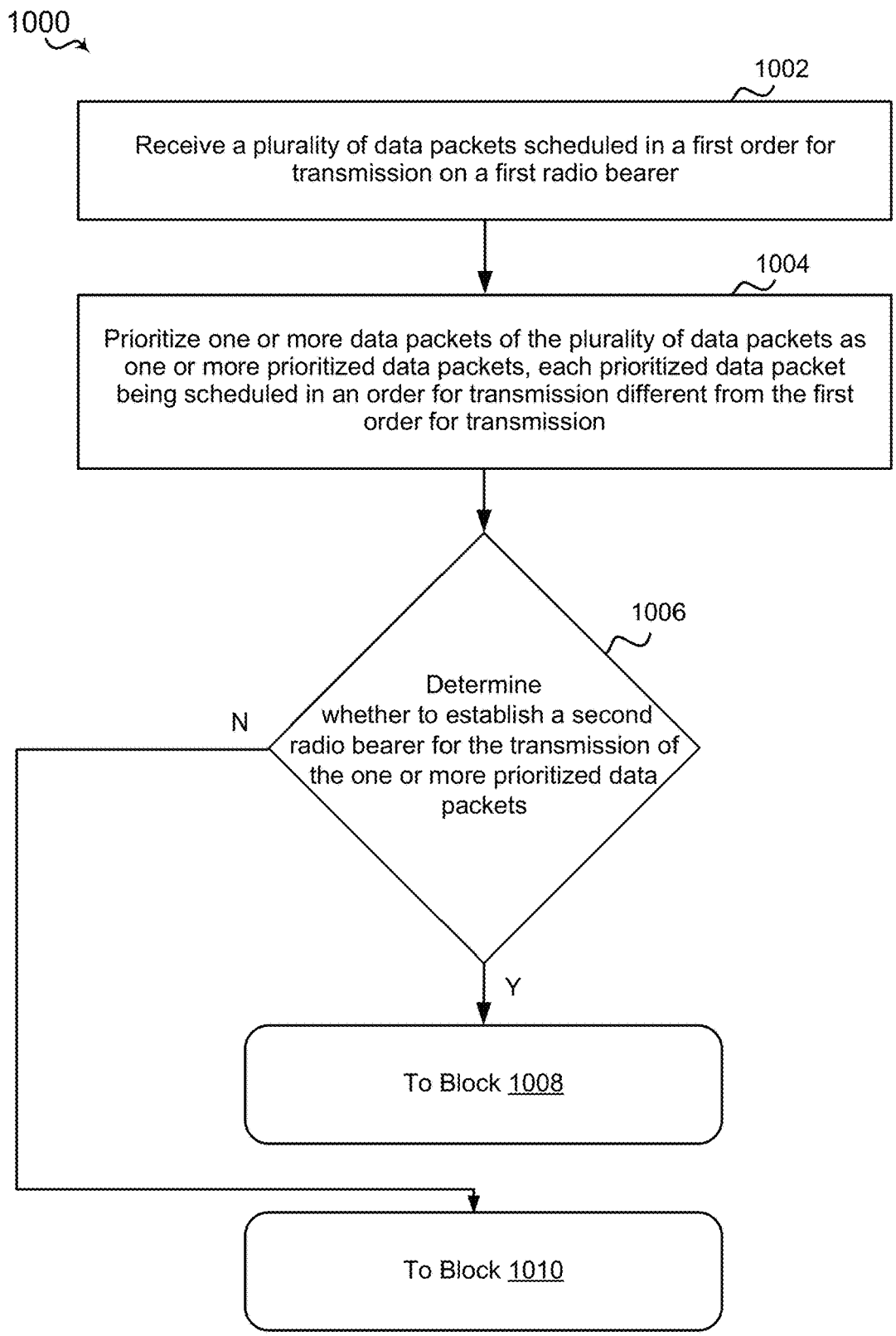
Figure 10B:
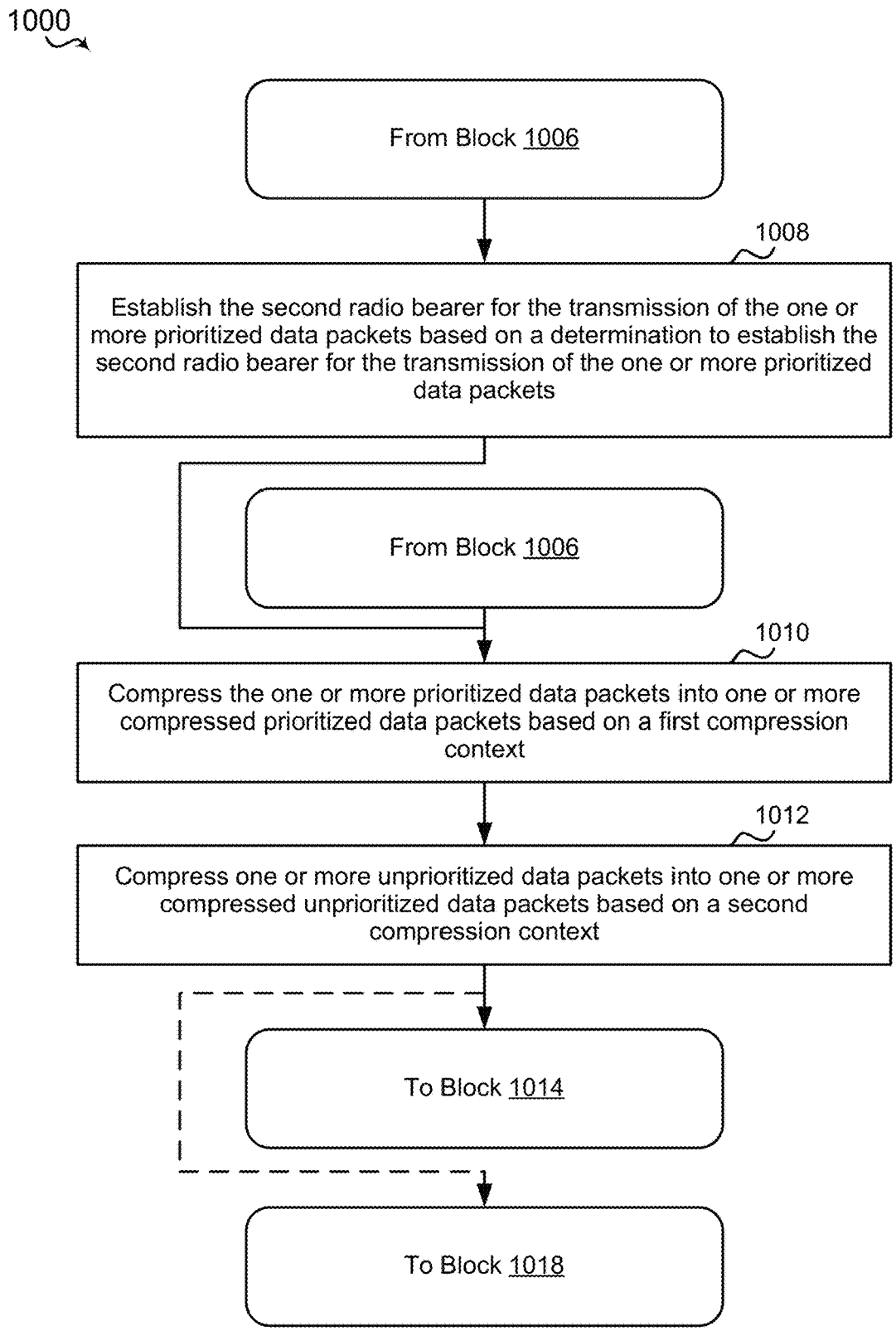

Referring to FIGS. 10A, 10B, and 10C, for example, a method 1000 of wireless communication in operating the UE 110 according to the above-described aspects to prioritizing data packets when stateful compression is enabled includes one or more of the herein-defined actions.

At block 1002, the method 1000 may receive a plurality of data packets scheduled in a first order for transmission on a first radio bearer. For example, the UE 110 may execute call processing component 142 to receive a plurality of data packets 152 scheduled in a first order for transmission on a first radio bearer 602.

At block 1004, the method 1000 may prioritize one or more data packets of the plurality of data packets as one or more prioritized data packets, each prioritized data packet being scheduled in an order for transmission different from the first order for transmission. For example, the UE 110 and/or call processing component 142 may execute the prioritization component 150 to prioritize one or more data packets of the plurality of data packets 152 as one or more prioritized data packets 154 with each prioritized data packet 154 being scheduled in an order for transmission different from the first order for transmission.

In an aspect, prioritizing the one or more data packets of the plurality of data packets 152 further comprises prioritizing the one or more data packets of the plurality of data packets 152 in at least one of a TCP layer or IP layer. In an example, the one or more prioritized data packets 154 correspond to TCP ACKs. Further, the one or more unprioritized data packets 156 correspond to UL TCP DATA.

At block 1006, the method 1000 may determine whether to establish a second radio bearer for the transmission of the one or more prioritized data packets. For example, the UE 110 and/or call processing component 142 may execute the determination component 190 to determine whether to establish a second radio bearer 604 for the transmission of the one or more prioritized data packets 154. If the determination component 190 determines to establish the second radio bearer 604, then method 1000 proceeds to block 1008. If not, then method 1000 proceeds to block 1010.

At block 1008, the method 1000 may establish the second radio bearer for the transmission of the one or more prioritized data packets based on a determination to establish the second radio bearer for the transmission of the one or more prioritized data packets. For example, the UE 110 and/or call processing component 142 may execute the determination component 190 to establish the second radio bearer 604 for the transmission of the one or more prioritized data packets 154 based on a determination to establish the second radio bearer 604 for the transmission of the one or more prioritized data packets 154. In an example, method 1000 includes enabling compression of the one or more prioritized data packets 154 on the second radio bearer 604.

At block 1010, the method 1000 may compress the one or more prioritized data packets into one or more compressed prioritized data packets based on a first compression context. For example, the UE 110 and/or call processing component 142 may execute the compressor component 160 to compress the one or more prioritized data packets 154 into one or more compressed prioritized data packets 162 based on a first compression context 166.

At block 1012, the method 1000 may compress one or more unprioritized data packets into one or more compressed unprioritized data packets based on a second compression context. For example, the UE 110 and/or call processing component 142 may execute the compressor component 160 to compress one or more unprioritized data packets 156 into one or more compressed unprioritized data packets 164 based on a second compression context 168.

In an aspect, compressing the one or more prioritized data packets 154 into one or more compressed prioritized data packets 162 based on a first compression context 166 and compressing the one or more unprioritized data packets 156 into one or more compressed unprioritized data packets 164 based on a second compression context 168 further comprises compressing the one or more prioritized data packets 154 into one or more compressed prioritized data packets 162 and compressing the one or more unprioritized data packets 156 into one or more compressed unprioritized data packets 164 based on an UDC procedure. In an example, the first compression context 166 corresponds to a first compressor memory configured to store data strings for the one or more prioritized data packets 154 and the second compression context 168 corresponds to a second compressor memory configured to store data strings for the one or more unprioritized data packets 156. Further, each compressed prioritized data packet 162 and each compressed unprioritized data packet 164 includes a header with compression context information indicating either the first compressor memory or the second compressor memory. Additionally, the UDC procedure includes utilizing at least one of a UDC data packet, a UDC control packet, and a Radio Resource Control (RRC) signaling message configured to support multiple compressor memories.

In another aspect, compressing the one or more prioritized data packets 154 into one or more compressed prioritized data packets 162 based on a first compression context 166 and compressing the one or more unprioritized data packets 156 into one or more compressed unprioritized data packets 164 based on a second compression context 168 further comprises compressing the one or more prioritized data packets 154 into one or more compressed prioritized data packets 162 and compressing the one or more unprioritized data packets 156 into one or more compressed unprioritized data packets 164 based on a ROHC procedure. In an example, each compressed prioritized data packet 162 and each compressed unprioritized data packet 164 includes a header with flow context identification indicating a priority of each compressed prioritized data packet 162 or each compressed unprioritized data packet 164.

Based on the results of the determination at block 1006, the method 1000 may proceed to either block 1014 or 1018. For example, if the determination component 190 establishes the second radio bearer 604 for the transmission of the one or more prioritized data packets 154, then method 1000 proceeds to block 1014. Otherwise, if the determination component 190 does not establish the second radio bearer 604 for the transmission of the one or more prioritized data packets 154, then method 1000 proceeds to block 1018.

At block 1014, the method 1000 may schedule the one or more compressed prioritized data packets for transmission on the second radio bearer. For example, the UE 110 and/or call processing component 142 may execute the scheduler component 170 to schedule the one or more compressed prioritized data packets 162 for transmission on the second radio bearer 604.

At block 1016, the method 1000 may schedule the one or more compressed unprioritized data packets for transmission on the first radio bearer. For example, the UE 110 and/or call processing component 142 may execute the scheduler component 170 to schedule the one or more compressed unprioritized data packets 164 for transmission on the first radio bearer 602.

At block 1018, the method 1000 may optionally schedule the one or more compressed prioritized data packets and the one or more compressed unprioritized for transmission on the first radio bearer based on a determination not to establish the second radio bearer for the transmission of the one or more prioritized data packets. For example, the UE 110 and/or call processing component 142 may execute the scheduler component 170 to schedule the one or more compressed prioritized data packets 162 and the one or more compressed unprioritized data packets 164 for transmission on the first radio bearer 602 based on a determination not to establish the second radio bearer 604 for the transmission of the one or more prioritized data packets 154.

In an aspect, method 1000 further includes transmitting the one or more compressed prioritized data packets 162 and the one or more compressed unprioritized data packets 164. For example, UE 110 may execute transceiver 1102 (FIG. 11) to transmit the one or more compressed prioritized data packets 162 on the second radio bearer 604. Further, UE 110 may execute transceiver 1102 to transmit the one or more compressed unprioritized data packets 164 on the first radio bearer 602. Optionally, UE 110 may execute transceiver 1102 to transmit the one or more compressed prioritized data packets 162 and the one or more compressed unprioritized data packet 164 for transmission on the first radio bearer 602 based on a determination not to establish the second radio bearer 604 for the transmission of the one or more prioritized data packets 154.

In an aspect, method 1000 may further include determining whether a prioritization parameter disabling prioritization satisfies a threshold, and disabling prioritization of the one or more data packets based a determination that the prioritization parameter satisfies the threshold. For example, the prioritization parameter corresponds to an amount of time that prioritization has occurred, and the threshold corresponds to a maximum period of time configured for prioritization. In another example, the prioritization parameter corresponds to a number of remaining uncompressed data packets of the plurality of data packets 152, and the threshold corresponds to a minimum number of remaining data packets configured for prioritization.

Figure 11:
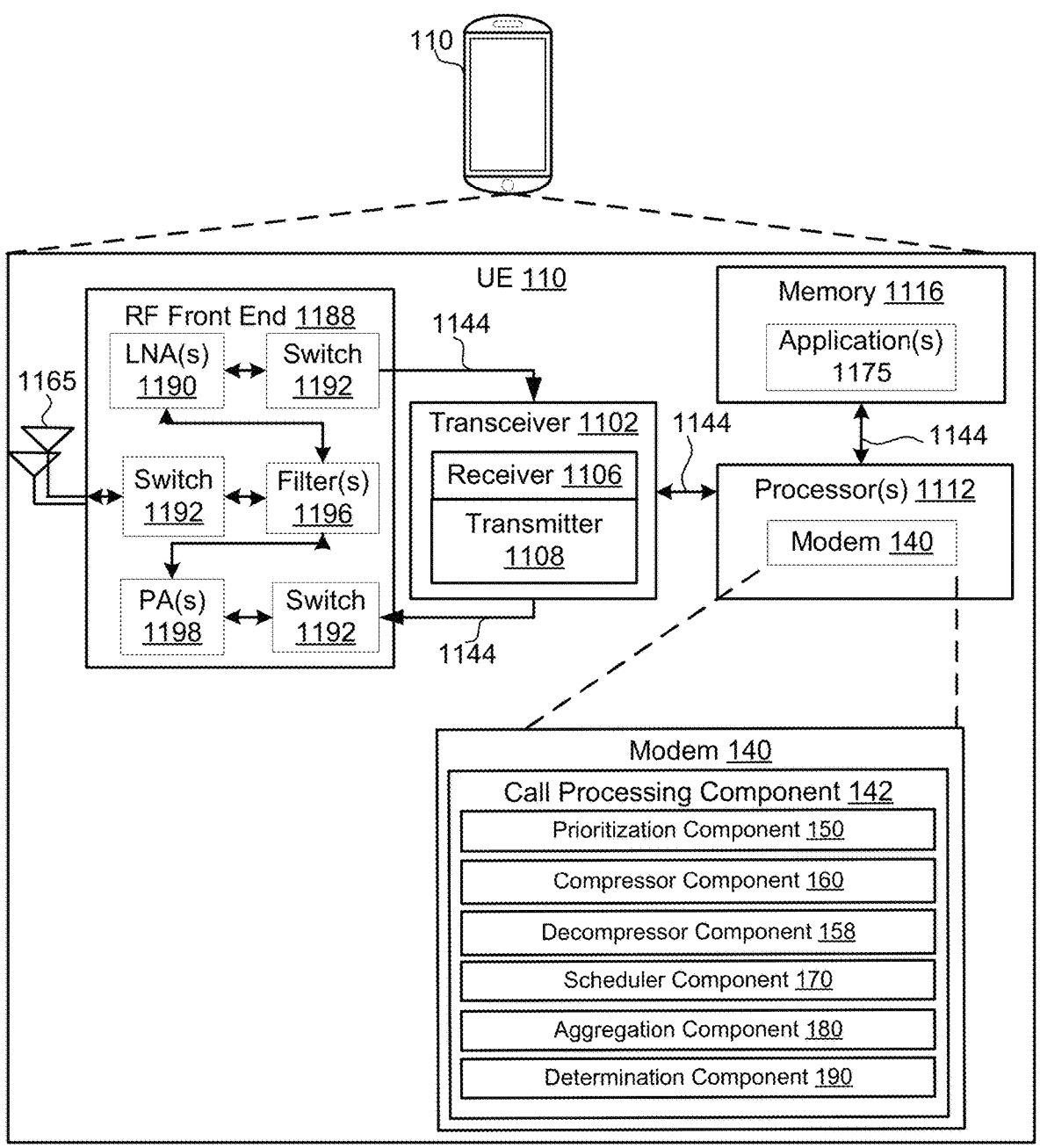
FIG. 11 is a schematic diagram of example components of the UE of FIG. 1.

Referring to FIG. 11, one example of an implementation of an UE 110 may include a variety of components, some of which have already been described above, but including components such as one or more processors 1112 and memory 1116 and transceiver 1102 in communication via one or more buses 1144, which may operate in conjunction with modem 140 and call processing component 142 to prioritize data packets when stateful compression is enabled for wireless communications. Further, the one or more processors 1112, modem 1114, memory 1116, transceiver 1102, radio frequency (RF) front end 1188 and one or more antennas 1165, may be configured to support voice and/or data calls (simultaneously or non-simultaneously) in one or more radio access technologies. In some aspects, the modem 140 may be the same as or similar to the modem 140 (FIG. 1).

In an aspect, the one or more processors 1112 can include a modem 140 that uses one or more modem processors. The various functions related to call processing component 142 may be included in modem 140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with the transceiver 1102. In other aspects, some of the features of the one or more processors 1112 and/or modem 140 associated with prioritization component 150 may be performed by transceiver 1102.

Also, memory 1116 may be configured to store data used herein and/or local versions of applications 1175 or prioritization component 150 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining call processing component 142 and/or one or more of its subcomponents, and/or data associated therewith, when UE 110 is operating at least one processor 1112 to execute call processing component 142 and/or one or more of its subcomponents.

The transceiver 1102 may include at least one receiver 1106 and at least one transmitter 1108. The receiver 1106 may include hardware, firmware, and/or software code executable by a processor for receiving data, the code comprising instructions and being stored in a memory (e.g., computer-readable medium). The receiver 1106 may be, for example, a RF receiver. In an aspect, the receiver 1106 may receive signals transmitted by at least one base station 105. Additionally, the receiver 1106 may process such received signals, and also may obtain measurements of the signals, such as, but not limited to, Ec/Io, SNR, RSRP, RSSI, etc. The transmitter 1108 may include hardware, firmware, and/or software code executable by a processor for transmitting data, the code comprising instructions and being stored in a memory (e.g., computer-readable medium). A suitable example of the transmitter 1108 may include, but is not limited to, an RF transmitter.

Moreover, in an aspect, the UE 110 may include an RF front end 1188, which may operate in communication with one or more antennas 1165 and transceiver 1102 for receiving and transmitting radio transmissions, for example, wireless communications transmitted by at least one base station 105 or wireless transmissions transmitted by the UE 110. The RF front end 1188 may be communicatively coupled with the one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, the LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by the RF front end 1188 to amplify a signal for an RF output at a desired output power level. In an aspect, each PA 1198 may have specified minimum and maximum gain values. In an aspect, the RF front end 1188 may use one or more switches 1192 to select a particular PA 1198 and a corresponding specified gain value based on a desired gain value for a particular application.

Also, for example, one or more filters 1196 can be used by the RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, the RF front end 1188 can use one or more switches 1192 to select a transmit or receive path using a specified filter 1196, LNA 1190, and/or PA 1198, based on a configuration as specified by transceiver 1102 and/or processor 1112.

As such, the transceiver 1102 may be configured to transmit and receive wireless signals through one or more antennas 1165 via RF front end 1188. In an aspect, the transceiver 1102 may be tuned to operate at specified frequencies such that the UE 110 can communicate with, for example, one or more base stations 105 or one or more cells associated with one or more base stations 105. In an aspect, for example, the modem 140 can configure the transceiver 1102 to operate at a specified frequency and power level based on the UE configuration of the UE 110 and the communication protocol used by the modem 140.

In an aspect, modem 140 can be a multiband-multimode modem, which can process digital data and communicate with the transceiver 1102 such that the digital data is sent and received using the transceiver 1102. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 12:
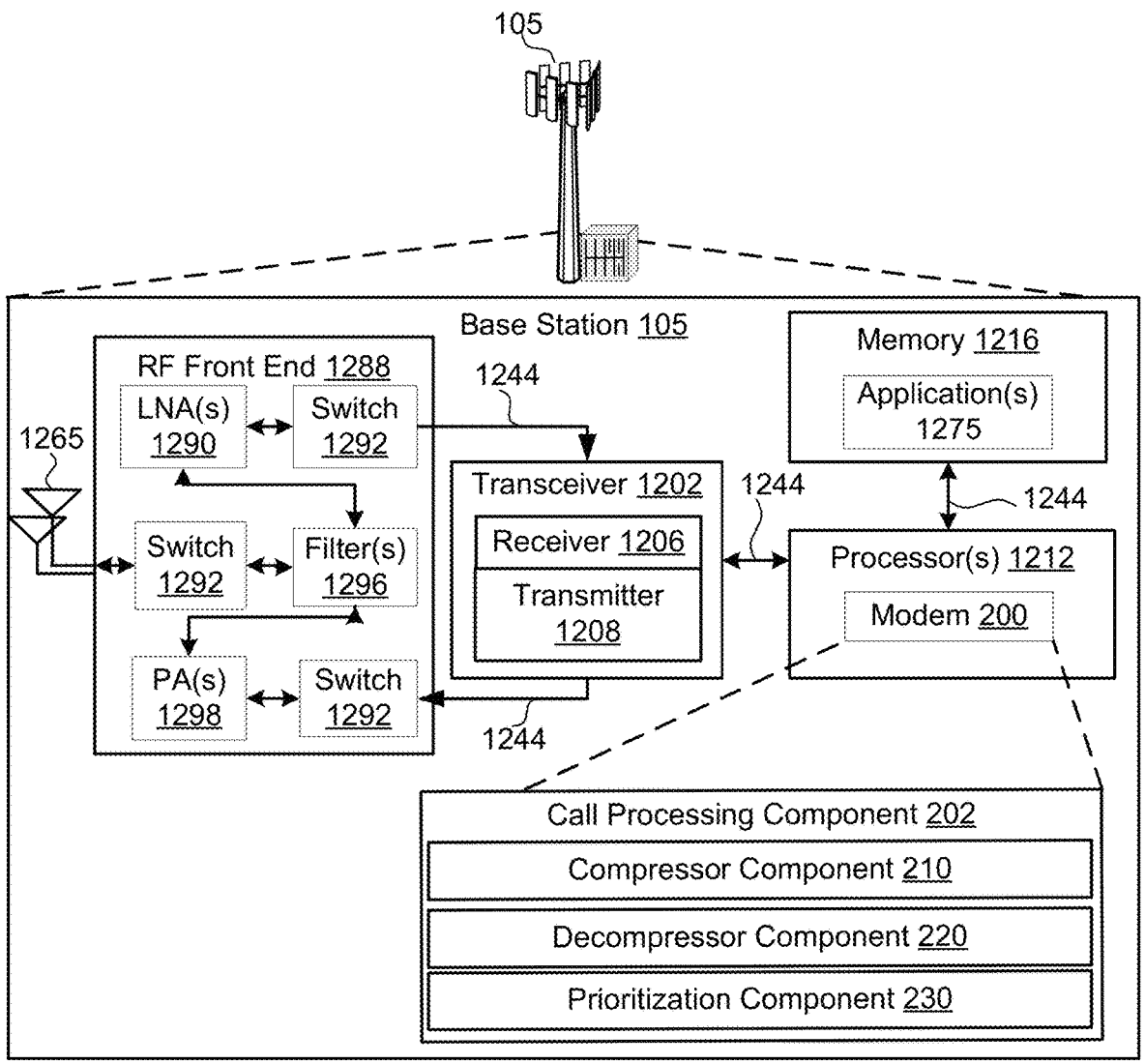
FIG. 12 is a schematic diagram of example components of the base station of FIG. 1.

Referring to FIG. 12, one example of an implementation of base station 105 may include a variety of components, some of which have already been described above, but including components such as one or more processors 1212, a memory 1216, and a transceiver 1202 in communication via one or more buses 1244, which may operate in conjunction with modem 200 and call processing component 202 configured to prioritize data packets when stateful compression is enabled for wireless communications.

The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
   receiving a plurality of data packets scheduled in a first order for transmission;
   prioritizing one or more data packets of the plurality of data packets as one or more prioritized data packets, each prioritized data packet being scheduled in an order for transmission different from the first order for transmission;
   compressing, via a stateful compression technique in accordance with the first order, one or more unprioritized data packets of the plurality of data packets into one or more compressed unprioritized data packets at a first layer and not compressing the one or more prioritized data packets of the plurality of data packets at the first layer; and
   scheduling the one or more prioritized data packets and the one or more compressed unprioritized data packets in a second order for transmission, the second order differing from the first order.

2. The method of claim 1, wherein the second order for transmission corresponds to scheduling the one or more prioritized data packets for transmission prior to the one or more compressed unprioritized data packets.

3. The method of claim 1, wherein prioritizing the one or more data packets of the plurality of data packets further comprises prioritizing the one or more data packets of the plurality of data packets scheduled for transmission based on a traffic model of a data flow corresponding to the plurality of data packets.

4. The method of claim 3, wherein the traffic model corresponds to a bi-directional communication and indicates that data packets corresponding to acknowledgement messages are to be prioritized.

5. The method of claim 4, wherein the acknowledgement messages correspond to Transmission Control Protocol (TCP) Acknowledgements (ACKs), and the first layer is a TCP layer.

6. The method of claim 4, wherein the one or more unprioritized data packets correspond to Uplink (UL) Transmission Control Protocol (TCP) DATA, and the first layer is a TCP layer.

7. The method of claim 1, wherein prioritizing the one or more data packets of the plurality of data packets further comprises prioritizing the one or more data packets of the plurality of data packets in at least one of a Transmission Control Protocol (TCP) layer or Internet Protocol (IP) layer.

8. The method of claim 1, wherein compressing the one or more unprioritized data packets of the plurality of data packets into the one or more compressed unprioritized data packets further comprises compressing the one or more unprioritized data packets of the plurality of data packets into the one or more compressed unprioritized data packets based on at least one of a Robust Header Compression (ROHC) procedure or an Uplink Data Compression (UDC) procedure.

9. A system comprising:
   a memory storing instructions thereon; and
   at least one processor coupled with the memory and configured by the instructions to:
      receive a plurality of data packets scheduled in a first order for transmission;
      prioritize one or more data packets of the plurality of data packets as one or more prioritized data packets, each prioritized data packet being scheduled in an order for transmission different from the first order for transmission;
      compress, via a stateful compression technique in accordance with the first order, one or more unprioritized data packets of the plurality of data packets into one or more compressed unprioritized data packets at a first layer and not compress the one or more prioritized data packets of the plurality of data packets at the first layer; and
      schedule the one or more prioritized data packets and the one or more compressed unprioritized data packets in a second order for transmission, the second order differing from the first order.

10. The system of claim 9, wherein the second order for transmission corresponds to scheduling the one or more prioritized data packets for transmission prior to the one or more compressed unprioritized data packets.

11. The system of claim 9, wherein to prioritize the one or more data packets of the plurality of data packets, the at least one processor is configured by the instructions to prioritize the one or more data packets of the plurality of data packets scheduled for transmission based on a traffic model of a data flow corresponding to the plurality of data packets.

12. The system of claim 11, wherein the traffic model corresponds to a bi-directional communication and indicates that data packets corresponding to acknowledgement messages are to be prioritized.

13. The system of claim 12, wherein the acknowledgement messages correspond to Transmission Control Protocol (TCP) Acknowledgements (ACKs) and the first layer is a TCP layer.

14. The system of claim 12, wherein the one or more unprioritized data packets correspond to Uplink (UL) Transmission Control Protocol (TCP) DATA and the first layer is a TCP layer.

15. The system of claim 9, wherein to prioritize the one or more data packets of the plurality of data packets, the at least one processor is configured by the instructions to prioritize the one or more data packets of the plurality of data packets in at least one of a Transmission Control Protocol (TCP) layer or Internet Protocol (IP) layer.

16. The system of claim 9, wherein to compress the one or more unprioritized data packets of the plurality of data packets into the one or more compressed unprioritized data packets, the at least one processor is configured by the instructions to compress the one or more unprioritized data packets of the plurality of data packets into the one or more compressed unprioritized data packets based on at least one of a Robust Header Compression (ROHC) procedure or an Uplink Data Compression (UDC) procedure.

17. A non-transitory computer-readable device having instructions thereon that, when executed by at least one computing device, causes the at least one computing device to perform operations comprising:
  receiving a plurality of data packets scheduled in a first order for transmission;
  prioritizing one or more data packets of the plurality of data packets as one or more prioritized data packets, each prioritized data packet being scheduled in an order for transmission different from the first order for transmission;
  compressing, via a stateful compression technique in accordance with the first order, one or more unprioritized data packets of the plurality of data packets into one or more compressed unprioritized data packets at a first layer and not compressing the one or more prioritized data packets of the plurality of data packets at the first layer; and
  scheduling the one or more prioritized data packets and the one or more compressed unprioritized data packets in a second order for transmission, the second order differing from the first order.

18. The non-transitory computer-readable device of claim 17, wherein the second order for transmission corresponds to scheduling the one or more prioritized data packets for transmission prior to the one or more compressed unprioritized data packets.

19. The non-transitory computer-readable device of claim 17, wherein prioritizing the one or more data packets of the plurality of data packets further comprises prioritizing the one or more data packets of the plurality of data packets scheduled for transmission based on a traffic model of a data flow corresponding to the plurality of data packets.

20. The non-transitory computer-readable device of claim 19, wherein the traffic model corresponds to a bi-directional communication and indicates that data packets corresponding to acknowledgement messages are to be prioritized.

21. The non-transitory computer-readable device of claim 20, wherein the acknowledgement messages correspond to Transmission Control Protocol (TCP) Acknowledgements (ACKs) and the first layer is a TCP layer.

22. The non-transitory computer-readable device of claim 20, wherein the one or more unprioritized data packets correspond to Uplink (UL) Transmission Control Protocol (TCP) DATA and the first layer is a TCP layer.

23. The non-transitory computer-readable device of claim 20, wherein prioritizing the one or more data packets of the plurality of data packets further comprises prioritizing the one or more data packets of the plurality of data packets in at least one of a Transmission Control Protocol (TCP) layer or Internet Protocol (IP) layer.

24. The non-transitory computer-readable device of claim 19, wherein compressing the one or more unprioritized data packets of the plurality of data packets into the one or more compressed unprioritized data packets further comprises compressing the one or more unprioritized data packets of the plurality of data packets into the one or more compressed unprioritized data packets based on at least one of a Robust Header Compression (ROHC) procedure or an Uplink Data Compression (UDC) procedure.

* * * * *